(12) United States Patent
Madruga et al.

(10) Patent No.: US 6,917,985 B2
(45) Date of Patent: Jul. 12, 2005

(54) CORE ASSISTED MESH PROTOCOL FOR MULTICAST ROUTING IN AD-HOC NETWORKS

(75) Inventors: Ewerton L. Madruga, Santa Cruz, CA (US); Joaquin J. Garcia-Luna-Aceves, San Mateo, CA (US)

(73) Assignee: The Regents of the University of California, Oakland, CA (US)

( * ) Notice: Subject to any disclaimer, the term of this patent is extended or adjusted under 35 U.S.C. 154(b) by 817 days.

(21) Appl. No.: 09/802,476

(22) Filed: Mar. 9, 2001

(65) Prior Publication Data

US 2001/0034793 A1 Oct. 25, 2001

Related U.S. Application Data

(60) Provisional application No. 60/188,382, filed on Mar. 10, 2000.

(51) Int. Cl.[7] ............................................. G06F 15/173
(52) U.S. Cl. ....................... 709/238; 709/201; 709/240; 709/241; 709/242; 370/238; 370/351; 370/409
(58) Field of Search ................................. 709/200–202, 709/237–242, 230; 370/256, 351, 390, 397, 408, 409, 238, 328–329, 431–432; 701/10; 707/10

(56) References Cited

U.S. PATENT DOCUMENTS

| | | | |
|---|---|---|---|
| 6,003,064 A * | 12/1999 | Wicki et al. ................. | 709/238 |
| 6,088,333 A * | 7/2000 | Yang et al. .................. | 709/238 |
| 6,353,596 B1 * | 3/2002 | Grossglauser et al. ...... | 370/256 |
| 6,408,000 B1 * | 6/2002 | Lamberg et al. ............ | 370/390 |
| 6,611,872 B1 * | 8/2003 | McCanne .................... | 709/238 |
| 6,615,273 B1 * | 9/2003 | Pan ............................ | 709/242 |
| 6,621,805 B1 * | 9/2003 | Kondylis et al. ........... | 370/329 |
| 6,678,735 B1 * | 1/2004 | Orton et al. ................. | 709/230 |
| 6,721,290 B1 * | 4/2004 | Kondylis et al. ........... | 370/329 |
| 6,816,912 B1 * | 11/2004 | Borella et al. .............. | 709/238 |
| 6,842,425 B1 * | 1/2005 | Mannepalli et al. ........ | 370/238 |
| 6,850,987 B1 * | 2/2005 | McCanne et al. ........... | 709/238 |

OTHER PUBLICATIONS

Deering, S.; "Host Extensions for IP Multicasting," Network Working Group, Request for Comments: 1112, Obseletes Request for Comments: 988 & 1054, Stanford University, pp. 1 thru 17, Aug., 1989.

Waitzman, D. et al.; "Distance Vector Multicast Routing Protocol," Network Working Group Request for Comments: 1075, Stanford University, pp. 1 thru 24, Nov., 1998.

Wu, C.W.; "AD HOC Multicast Routing Protocol Utilizing Increasing ID–Numbers (AMRIS) Functional Specification," Network Working Group, Internet Draft, National University of Singapore and Georgia Institute of Technology, pp. 1 thru 21, Nov., 1998.

(Continued)

*Primary Examiner*—Bharat Barot
(74) *Attorney, Agent, or Firm*—John P. O'Banion

(57) ABSTRACT

A method of providing multicast routing for use in ad hoc broadcast networks, such as wireless and mobile networks. The method is described within a protocol referred to as core-assisted mesh protocol, or CAMP. The method departs from traditional tree-structured multicast protocols and utilizes multicast meshes in which the network need not be flooded with control or data packets to establish routing paths. Each router configured for CAMP is capable of accepting unique packets arriving from any neighbor in the mesh, wherein packets are forwarded along reverse shortest paths to the receiver. Multiple cores may be defined for a group wherein the loss of a single core does not prevent packet flow. Routers for sender-only hosts are allowed to join the multicast mesh in simplex mode, and in certain cases may join without the sending of a join request.

12 Claims, 20 Drawing Sheets

OTHER PUBLICATIONS

Perkins, Charles E. et al.; "AD HOC On–Demand Distance Vector (AODV) Routing," Network Working Group, Internet Draft, Sun Microsystems Labs, University of California–Santa Barbara, University of Texas–San Antonio, pp. 1 thru 32, Jun., 1999.

Lee, Sung–Ju et al.; "On–Demand Multicast Routing Protocol (ODMRP) for AD HOC Networks," IETF Manet Working Group, Internet Draft, University of CaliforniaLos Angeles, pp. 1 thru 29, Jan., 2000.

Bommaiah, McAuley, and Talpade; "Amroute: ADHOC Multicast Routing Protocol," Bellcore, University of Maryland, pp. 1 thru 24, Aug., 1998.

Corson, M. Scott and Batsell, Stephen G.; "A Reservation-Based Multicast (RBM) Routing Protocol for Mobile Networks: Initial Route Construction Phase," Proceedings IEEE INFOCOM, 1995, Boston, MA., pp. 1 thru 37, Apr., 1995.

Perkins, Charles E. and Bhagwat, Pravin; "Highly Dynamic Destination–Sequenced Distance Vector Routing (DSDV) for Mobile Computers," Proceedings ACM SIGCOMM 1994, London, United Kingdom, pp. 1 thru 11, (1994).

Corson, M. Scott and Park, Vincent D.; "A Highly Adaptive Distributed Routing Algorithm for Mobile Wireless Networks," Proceedings IEEE INFOCOM, 1997, Kobe, Japan, pp. 1 thru 9, Apr., 1997.

Garcia–Luna–Aceves, J.J. et al.; "Wireless Internet Gateways (Wings)," Proceedings IEEE MILCOM, 1997, Monterey, California, pp. 1271 thru 1276, Nov. 2–5, 1997.

Shields, Clay et al.; "The Ordered Core Based Tree Protocol," Proceedings IEEE INFOCOM, 1997, Kobe, Japan, pp. 885–892, May, 1997.

Spohn, M. et al.; "Scalable Link–State Internet Routing," Proceedings VI IEEE International Conference Network Protocols (ICNP '98), Austin, Texas, pp. 52 thru 61, (1998).

Chiang, C. and Gerla, M.; "On–Demand Multicast in Mobile Wireless Networks," Proceedings IEEE ICNP '98, Austin, Texas, pp. 1 thru 9, (1998).

Deering, Scott et al.; "An Architecture for Wide–Area Multicast Routing," Proceedings ACM SIGCOMM '94, London, United Kingdom, pp. 126–135, (1994).

Garcia–Luna–Aceves, J.J. and Madruga, Ewerton L.; "The Core–Assisted Mesh Protocol," IEEE Journal on Selected Areas in Communications, vol. 17, No. 8, pp. 1380 thru 1394, Aug., 1999.

Garcia–Luna–Aceves, J.J. and Madruga, Ewerton L.; "A Multicast Routing Protocol for AD–HOC Networks," Proceedings IEEE INFOCOM '99, New York, New York, pp. 784 thru 792, (1999).

Madruga, E.L. and Garcia–Luna–Aceves, J.J.; "Scalable Multicasting: The Core Assisted Mesh Protocol," accepted for publication in ACM/Baltzer Mobile Networks and Applications Journal, Special Issue on Management of Mibility, pp. 1 thru 27, (1999).

Madruga, E.L. and Garcia–Luna–Aceves, J.J.; "Multicasting Along Meshes in AD–HOC Networks," Internal Document, University of California, Santa Cruz, pp. 1 thru 5, (1999).

* cited by examiner

Procedure HandleJoin($gp, n, s$)
parameters
   $gp$      Multicast group to join
   $n$       Neighbor $n$ transmitter of request
   $s$       Node originating join request
begin
  if ( $s = i$ )
     return; [ we don't want join loops, so ignore... ]
  endif
  $g \leftarrow \{group\ x\ |\ x \in MRT_i, x.group = gp\}$;
  if ( $g = \emptyset$ )
     [ Group is unknown ]
     $g.group \leftarrow gp$;
     $g.status \leftarrow g.status \land NOT\_MEMBER$;
     $MRT_i \leftarrow MRT_i \cup \{g\}$;
  endif
  if ( $i \in CORES_{gp}$ )
     [ this node is one of the cores ]
     $g.status \leftarrow g.status \land CORE$;
     $core \leftarrow i$;
  else
     $core \leftarrow \{node\ k\ |\ k \in CAM_i^{gp}\}$;
  endif
  if ( $core \neq \emptyset$ )
     if ( isDuplex($i, g$) )
        call HandleJoinAmDuplex($gp, n, s$);
     else
        call HandleJoinAmNotDuplex($gp, n, core, s$);
     endif
  endif
end

FIG. 3

Procedure HandleJoinAmNotDuplex($g, n, k, s$)
parameters
    $g$    Multicast group to join
    $n$    Neighbor $n$ transmitter of request
    $k$    Chosen core for multicast group $g$
    $s$    Node originating join request
begin
    if ( $\{\exists nb \mid nb \in N_i^g, nb.status = DUPLEX \text{ and } nb \neq n\}$ )
        [ Any neighbor already a duplex member? ]
        $g.status \leftarrow g.status \wedge DUPLEX$; $g.modified \leftarrow TRUE$;
        call HandleJoinAmDuplex($g, n, s$);
        return;
    endif
    if ( $PEND_i^g = \emptyset$ )
        [ no pending duplex/simplex join ]
        $nb \leftarrow$ call NextHop2Core($k$);
        if ( $nb \neq \emptyset$ )
            $p.address \leftarrow n$;
            $p.status \leftarrow p.status \wedge DUPLEX$;
            $PEND_i^g \leftarrow PEND_i^g \cup \{p\}$;
            if ( $n = i$ and $n \notin LR_i^g$ )
                $lr.address \leftarrow n$;
                $lr.status \leftarrow lr.status \wedge PENDING$;
                $LR_i^g \leftarrow LR_i^g \cup \{lr\}$;
            endif
            call send($JOIN, g, nb, s$);
        endif
    else [ There is a pending request. ]
        $p \leftarrow \{x \mid x \in PEND_i^g\}$;
        if ( $p.address = i$ and $n \neq i$)
            $p.address \leftarrow n$; [ Previous request was local ]
        endif
        $p.status \leftarrow p.status \wedge DUPLEX$;
    endif
end

FIG. 4

Procedure HandlePushJoin($gp, n, s, src$)
parameters
    $gp$    Multicast group to join
    $n$    Neighbor $n$ transmitter of request
    $s$    Node originating push join request
    $src$    Node that is source of multicast data traffic
begin
  if ( $s = i$ )
    return; [ no loops, so ignore... ]
  endif
  $g \leftarrow \{group\ x\ |\ x \in MRT_i, x.group = gp\}$;
  if ( $g = \emptyset$ )
    [ Group is unknown ]
    $g.group \leftarrow gp$;
    $g.status \leftarrow g.status \wedge NOT\_MEMBER$;
    $MRT_i \leftarrow MRT_i \cup \{g\}$;
  endif
  if ( isDirectlyConnected($i, src$) )
    [ Source of traffic is attached to me ]
    call HandlePushJoinDC($gp, n, s, src$);
  else
    call HandlePushJoinNonDC($gp, n, s, src$);
  endif
end

FIG. 7

Procedure HandlePushJoinNonDC($g, n, s, src$)
parameters
    $g$    Multicast group to join
    $n$    Neighbor $n$ transmitter of request
    $s$    Node originating join request
    $src$    Node that is source of multicast data traffic
begin
    if ( $\{\exists p \mid p \in PENDPJ_i^g, p.sender = src\}$ )
        [ Ignore PJ for an existing sender, ]
        [ but update info if this node started pj ]
        if ( $p.address = i$ )
            $p.address \leftarrow n$;
        endif
    else
        $nb \leftarrow$ call NextHop($src$);
        if ( $nb \neq \emptyset$ )
            $p.address \leftarrow n$;
            $p.sender \leftarrow src$;
            $p.status \leftarrow p.status \wedge NOT\_MEMBER$;
            $p.anchor \leftarrow NOT\_ANCHOR$;
            $PENDPJ_i^g \leftarrow PENDPJ_i^g \cup \{p\}$;
            call send($PUSH\_JOIN, g, nb, src, s$);
        endif
    endif
end

FIG. 8

CORE ASSISTED MESH PROTOCOL FOR MULTICAST ROUTING IN AD-HOC NETWORKS

CROSS-REFERENCE TO RELATED APPLICATIONS

This application claims priority from U.S. provisional application Ser. No. 60/188,382 filed on Mar. 10, 2000, incorporated herein by reference.

STATEMENT REGARDING FEDERALLY SPONSORED RESEARCH OR DEVELOPMENT

This invention was made with Government support under Grant Nos. F30602-97-2-0338 awarded by the Defense Advanced Research Projects Agency (AFOSR). The Government has certain rights in this invention.

REFERENCE TO A MICROFICHE APPENDIX

Not Applicable

BACKGROUND OF THE INVENTION

1. Field of the Invention

The present invention relates to packet routing within a network and more particularly to a method of performing multicast routing within an ad-hoc broadcast network utilizing a shared multicast mesh.

2. Description of the Background Art

With few exceptions, the methods used today for supporting many-to-many communication (multicasting) efficiently in computer networks involve routing trees. The basic approach consists of establishing a routing tree for a group of routing nodes (routers). Once a routing tree is established for a group of routers, a packet or message sent to all the routers in the tree traverses each router and link in the tree only once. Multicast routing trees (multicast trees for short) are being used extensively for multicast routing in computer networks and internets and have also been proposed for wireless multihop networks.

Because a multicast tree provides a single path between any two routers in the tree, the minimum number of copies per packet are used to disseminate packets to all the receivers of a multicast group. For a tree of N routers, a total of N-1 links are required to transmit the same information to all the routers in the multicast tree in a network with point-to-point links; in the case of wireless networks with broadcast links using a single channel, each member of a multicast tree needs to transmit a packet only once. Using routing trees is of course far more efficient than the brute-force approach of sending the same information from the source individually to each of the other N-1 times. An additional benefit of using trees for multicast routing is that the routing decisions at each router in the multicast tree becomes very simple: a router in a multicast tree that receives a multicast packet for the group over an in-tree interface forwards the packet over the rest of its in-tree interfaces.

However, multicast trees achieve the efficiency and simplicity just described by forcing a single path between any pair of routers. Accordingly, if multiple sources must transmit information to the same set of destinations, using routing trees requires that either a shared multicast tree be used for all sources or that a separate multicast tree be established for each source. Using a shared multicast tree has the disadvantage that packets are distributed to the multicast group along paths that can be much longer than the shortest paths from sources to receivers. Using a separate multicast tree for each source of each multicast group forces the routers that participate in multiple multicast groups to maintain an entry for each source in each multicast group, which does not scale as the number of groups and sources per group increase. In addition, because trees provide minimal connectivity among the members of a multicast group, the failure of any link in the tree partitions the group and requires the routers involved to reconfigure the tree.

An ad hoc network is a packet-switching network based on wireless links for router interconnection. The topology of an ad hoc network can be very dynamic due to the mobility of routers and the characteristics of the radio channels. Although tree-based multicast routing is very attractive for wired networks and the Internet because of its simplicity, it will be appreciated that tree-based multicasting is not as applicable to ad hoc networks with dynamic topologies. Maintaining a routing tree for the purposes of multicasting packets when the underlying topology changes frequently can incur substantial control traffic. Furthermore, during periods of routing-table instability, routers may be forced to stop forwarding packets while they wait for the multicast routing tree to be reconstructed.

Therefore a need exists for a routing protocol within ad hoc networks subject to dynamic changes that is capable of efficiently routing packets despite changing network conditions. The present invention satisfies that need, as well as others and overcomes deficiencies of previously developed solutions.

BRIEF SUMMARY OF THE INVENTION

The present invention provides a core-assisted mesh protocol (CAMP) for multicast routing in ad hoc networks that generalizes core-based trees into multicast meshes to enrich connectivity. A shared multicast mesh is defined for each multicast group, with the main goal of using such meshes being the maintenance of connectivity within multicast groups even under conditions in which network routers move frequently. CAMP consists of maintaining multicast meshes and loop-free packet forwarding over such meshes. Within the multicast mesh of a group, packets from any source in the group are forwarded along the reverse shortest path to the source, just as in traditional multicast protocols based on source-based trees. CAMP is capable of assuring that within a finite time, every receiver within a multicast group will have established a reverse shortest path to each source of the multicast group. Multicast packets for a group are forwarded along the shortest paths from sources to receivers defined within the group's mesh. Cores within multicast groups are utilized according to CAMP extensions of the core-based tree (CBT) protocol. In contrast to CBT, utilization of cores within CAMP provide only for limiting the traffic necessary for a router to join a multicast group, and multiple cores may be established within a multicast group. In addition, the failure of a core as used within a CAMP multicast mesh does not prevent packet forwarding or the process of maintaining the multicast mesh.

An object of the invention is to provide a routing structure for multipoint communication within an ad hoc network that is more resilient than tree structures.

Another object of the invention is to provide a routing structure for multipoint communication within an ad hoc network that utilizes communication resources with greater efficiency.

Another object of the invention is to provide a routing structure for multipoint communication within an ad hoc network that does not rely on flooding a network with data or control packets.

Another object of the invention is to provide a routing structure for multipoint communication within an ad hoc network that optimizes routing toward the shortest path.

Another object of the invention is to provide a routing structure for multipoint communication within an ad hoc network that is tolerant of highly dynamic conditions while providing increased efficiency in relation to trees.

Another object of the invention is to provide a routing structure for multipoint communication within an ad hoc network that assures that the shortest paths from receivers to sources are contained within the mesh associated with a group.

Another object of the invention is to provide a routing structure for multipoint communication within an ad hoc network that automatically maintains reverse shortest path mapping.

Another object of the invention is to provide a routing structure for multipoint communication within an ad hoc network that allows routers to join a multicast mesh in simplex mode.

Another object of the invention is to provide a routing structure for multipoint communication within an ad hoc network wherein packets continue to flow despite a router link failure.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a code fragment according to an aspect of the present invention, shown for handling incoming join requests.

FIG. 4 is a code fragment according to an aspect of the present invention, shown for handling incoming join requests by simplex and nonmember routers.

FIG. 7 is a code fragment according to an aspect of the present invention, shown for handling incoming push join (PJ) requests.

FIG. 8 is a code fragment according to an aspect of the present invention, shown for handling incoming push requests when a router is not directly connected to the traffic source.

DETAILED DESCRIPTION OF THE INVENTION

Figures 1, 2:
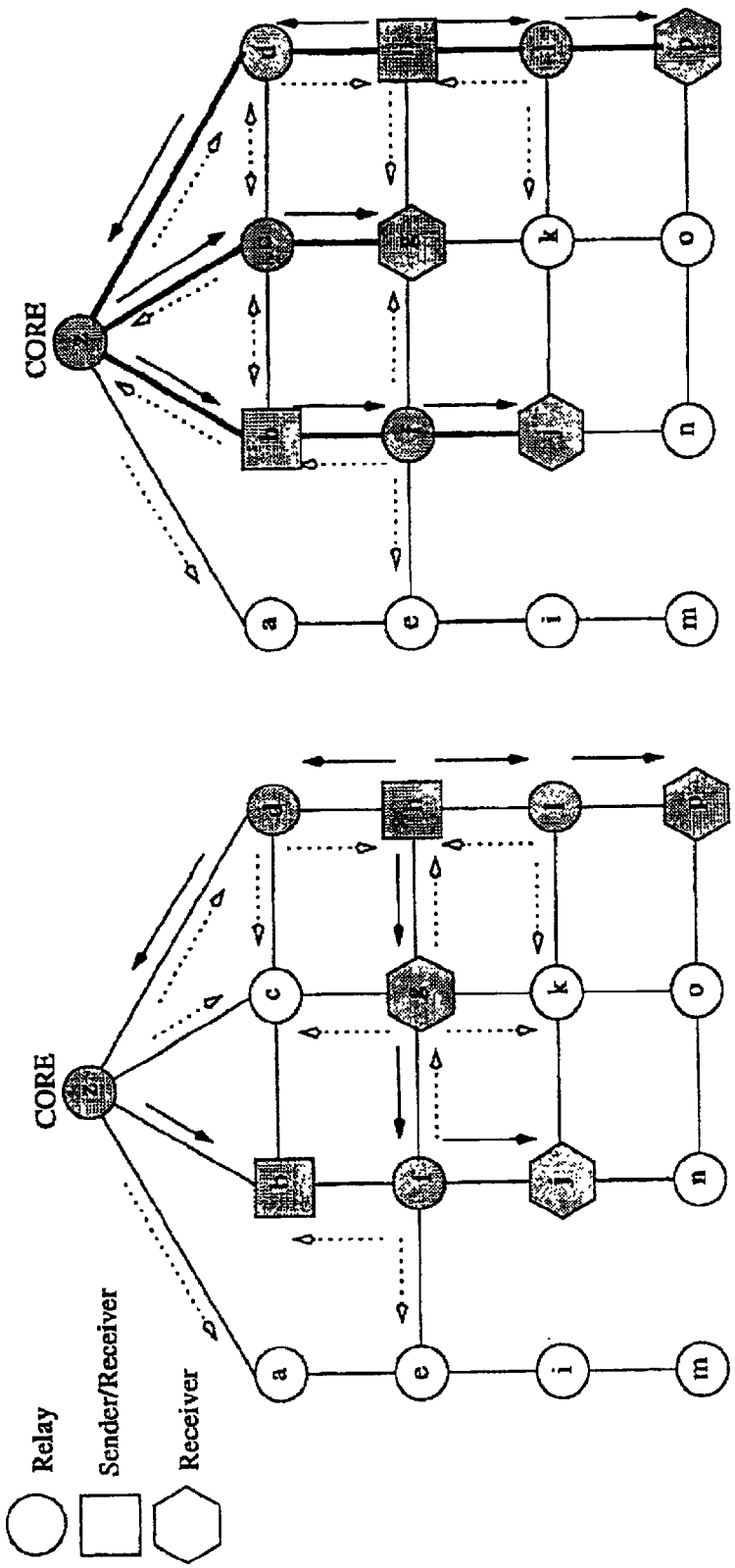
FIG. 1 is a traffic flow diagram between routers in a multicast mesh operating according to an embodiment of the present invention.
FIG. 2 is a traffic flow diagram between routers in a conventional multicast shared tree.
Figure 6:
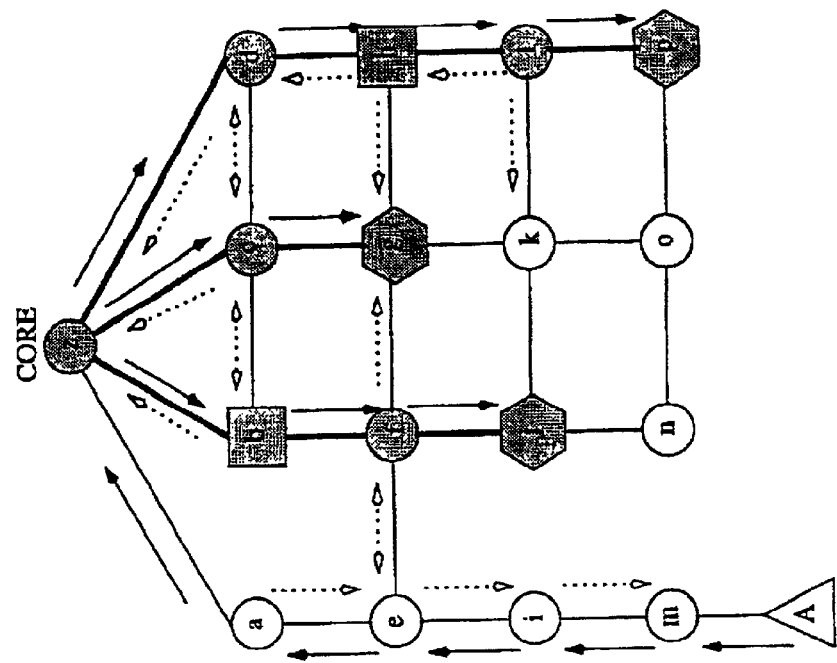
FIG. 6 is a traffic flow diagram between routers in a conventional multicast shared tree, showing incoming traffic flow from nonmember routers.

Referring more specifically to the drawings, for illustrative purposes the present invention is embodied in the apparatus generally shown in FIG. 1 through FIG. 22, excepting FIG. 2 and FIG. 6 which depict conventional protocols for comparative purposes. It will be appreciated that the apparatus may vary as to configuration and as to details of the parts, and that the method may vary as to the specific steps and sequence, without departing from the basic concepts as disclosed herein.

1. Overview of CAMP

The present invention focuses on multicast communication in ad hoc networks and presents a generalization of routing trees into graphs, referred to as multicast meshes. These multicast meshes provide greater connectivity than trees while preventing the occurrence of long-term or permanent routing loops. A protocol, referred to as Core-Assisted Mesh Protocol, CAMP, is described for establishing and maintaining routing structures for multipoint communication in an ad hoc network provides greater resilience than trees while increasing the efficiency with which communication resources are utilized. The CAMP routing structure provides a multicast routing protocol that eliminates the necessity of initially flooding an entire network or internet with data or control packets as is required in conventional tree-based protocols. It will be appreciated that protocols such as distance vector multicast routing protocol (DVMRP), and protocol independent (PIM-DM) both require flooding of the network with data packets, while forwarding group multicast protocol (FGMP) requires flooding of the network with control packets.

CAMP is designed to support multicast routing in highly dynamic ad hoc networks having broadcast links and adopts the same general architecture used in IP multicast. A mapping service is assumed to exist for providing these broadcast routers with the addresses of groups identified by their names, in a similar manner as internet devices are provided with node addresses by the domain name system (DNS). Hosts wishing to join a multicast group are required to first query the mapping service to obtain a group address and then interact with their local routers (referred to herein as routers) through Internet group multicast protocol (IGMP) or an equivalent host-to-router protocol to request membership in a multicast group. In addition to a naming service, CAMP assumes the availability of routing information from a unicast routing protocol that is capable of providing correct distances to known destinations within a finite time.

CAMP differs from typical multicast routing protocols in that it builds and maintains a multicast mesh for information distribution within each multicast group. A multicast mesh is a subset of the network topology that provides at least one path from each source to each receiver in the multicast group. CAMP ensures that the shortest paths from receivers to sources (referred to as "reverse shortest paths") are part of a group's mesh. Packets are forwarded through the mesh along the paths that first reach the routers from the sources, for example, the shortest paths from sources to receivers that can be defined within the mesh. CAMP does not predefine such paths along the mesh. A router keeps a cache of the identifiers of those packets it has forwarded recently and forwards a multicast packet received from a neighbor if the packet identifier is not in its cache. The key difference between a mesh and a tree structure is how data packets are accepted for processing. A multicast mesh router according to CAMP is allowed to accept unique packets coming from any neighbor in the mesh, as opposed to routers within a tree that is only able to accept packets coming from routers with whom a tree branch has been established. Therefore, keeping the branch information updated is an extra requirement that protocols based on trees are required to meet in a mobility scenario.

A member router of a multicast mesh, by contrast, has redundant paths to any other router in the same mesh, as a result, topology changes are less likely to disrupt the flow of multicast data and to require the reconstruction of the routing structures that support packet forwarding. A comparison of FIG. 1 and FIG. 2 illustrates a number of differences between the multicast mesh of FIG. 1 according to the present invention, and a conventional shared multicast tree of FIG. 2. Routers which are members of a multicast group are shown as shaded within the figure. The multicast mesh of FIG. 1 and multicast tree of FIG. 2 include routers that have host receivers, hosts that are senders and receivers, and routers that perform exclusively as relays. Router g is the last receiver to join the multicast group and does so in the multicast mesh through either router f or h; consequently, router c does not become a member of the mesh.

Data packet forwarding is illustrated from router h to the rest of the group in CAMP in FIG. 1 and in a shared-tree multicast protocol of FIG. 2. Solid arrows indicate the flow of traffic along the reverse shortest path in CAMP and a shared-tree in the multicast protocol; dashed arrows indicate overhead traffic due to the broadcast characteristics of the communication channel used to connect them. It will be appreciated that CAMP is capable of delivering data along shorter paths than a shared-tree multicast protocol. The length of paths incurred in multicasting over ad hoc networks is very important because longer paths unnecessarily utilize additional routers to forward packets. Furthermore, it will be appreciated that in the example, the number of routers receiving the packets sent by router h at least once is the same using the multicast mesh or the shared-tree. The foregoing discussion illustrates that utilizing multicast trees instead of meshes does not necessarily reduce traffic overhead in ad hoc networks with broadcast links.

CAMP extends the basic receiver-initiated approach introduced in the core-based tree (CBT) protocol for creating multicast trees, to enable the creation of multicast meshes. Cores are utilized to limit the control traffic necessary for a receiver to join a multicast group. In contrast to CBT, one or multiple cores can be defined for each mesh, the cores need not be contained in the mesh of their group, and routers can join a group even if all associated cores become unreachable. If neighboring routers belong to the group, a router may join the group by simply announcing its membership using either reliable or persistent updates. If none of the neighboring routers are members of the group, the router sends a join request toward a core for the group. If cores are not reachable from a router that needs to join a group, the router broadcasts its join request using an expanded ring search (ERS) that eventually reaches one of the group members. When one or multiple responses are sent back to the router, it chooses any of these responses to use as a path to the mesh.

CAMP in addition, provides an alternative method for routers connected to sender-only hosts to join the mesh. Whenever a router senses multicast packets originated at a host directly attached to it, this designated router joins the mesh in simplex mode if it is not a member yet. The simplex join request, just as a regular join request, will travel toward one of the available cores and is acknowledged in the same fashion. The conceptual difference is that packets should travel in only one direction; from the sender-only host to the mesh and not in the opposite direction. This encourages data traffic to be contained closer to regions of the mesh in which receivers are present. A router can leave the group when no other hosts or routers remain dependent on it by simply advertising the change in group membership to their neighbors.

The FGMP protocol and the on-demand multicast routing protocol (ODMRP) also build mesh variations. However, to establish group meshes, these protocols require flooding the ad hoc network with control packets. The difference between these two protocols is in which end performs the flooding. Within FGMP the receivers flood the network, while in ODMRP the senders flood the network. Approaches that require flooding to perform mapping updates are generally only acceptable for use in small networks. In contrast, the method of utilizing cores within CAMP requires network flooding only if all cores are unreachable from a connected component.

In general, ODMRP requires that all senders actively transmitting data packets periodically flood the network with a sender advertising packet. All routers directly connected to hosts willing to participate in the multicast group must process those advertising packets and update a member table. This member table lists all senders whose advertisements were received and the neighboring routers which are utilized as a next hop toward those senders. Periodically, the member table is also broadcast, and intermediate routers listed in member tables as a next hop to a sender will set a data forwarding flag, become group members, and keep/broadcast a member table themselves. ODMRP maintains a data packet cache in that is similar to CAMP. If the forwarding flag is set, and the data packet is not already in the packet cache, it is forwarded. FGMP is similar to the aforementioned approach, albeit receivers are the entities that flood membership advertisement packets, and senders keep track of receivers in the member table. Both ODMRP and FGMP have scalability problems due to the requirement for flooding the network with control packets. Simulation results quantify the scaling problems inherent in the mesh approach employed by ODMRP. Scalability problems within FGMP should be more severe than in ODMRP, because senders are required to track all receivers within a multicast group.

In contrast, CAMP utilizes a method for correcting route mapping which is based on the transmission of a heartbeat message to ensure that the mesh contains all the reverse shortest paths. Each mesh member temporarily keeps track of traffic sources whose packets come through members other than their respective reverse shortest paths to the sources, and sends out a heartbeat message to the successor in the reverse shortest path to the source given by the unicast RT. The received heartbeat message triggers a push join (PJ) message when the successor is not a mesh member. The PJ forces that specific successor and all routers in the path to the traffic source to join the mesh. Mesh components merge together by means of similar PJ's sent toward cores. The mappings of multicast addresses to (one or more) core addresses are disseminated from each core out to the network as part of group membership reports.

2. Routing Information Maintained in CAMP

Each router maintains a routing table (RT) built with the unicast routing protocol. This routing table is also modified by CAMP when multicast groups are to be inserted or removed. CAMP assumes the existence of a beaconing protocol, preferably embedded into the unicast routing protocol or available as a separate network service.

At router i, the RT made available to CAMP specifies, for each destination j, the successor ($s^i_j$) and the distance to the destination ($D^i_j$). Other than the RT, CAMP relies on the following data structures:

CAM—a table mapping cores to multicast groups;
$CORES_g$—a set of routers acting as cores to multicast group g;
$CACHE_i$—a cache of multicast data packet control information;
$MRT_i$—the multicast RT containing the set of groups known to router i;
$AT^g_i$—a table containing anchor information pertaining to the router, split in two subsets,
  $A^g_i$—a first list of neighbors with router i as an anchor for multicast group g,
  $A2^g_i$—a second list of neighbors who are anchors to router i in group g;
$N^g_i$—the list of neighbors for router i that are known to be members of the multicast group g;
$LS^g_i$—a list of senders that are directly attached to router i and send data traffic to multicast group g;
$LR^g_i$—a list of receivers directly attached to router i, that want to receive data packets from multicast group g;
$PEND^g_i$—a list of either join or simplex join requests to multicast group g originated at, or forwarded, by router i for whom acknowledgment is pending;
$PENDPJ^g_i$—a list of PJ requests to multicast group g originated at or forwarded by router i, for whom acknowledgment is pending;
$BK^g_i$—a list used for periodic "bookkeeping" of senders and associated anchors.

The CAM of router i consists of a vector of core-to-group address mappings. Each entry of the CAM specifies a group address and the addresses of the cores that can be contacted for that group. The packet-forwarding cache $CACHE_i$ maintains the identifier of packets recently processed by router i. The information maintained within this data structure is received from the IP packet header, comprising source address, destination address (group address), packet identification, and fragment offset. The address of the neighbor that relayed that packet is also stored. The main role of the packet forwarding cache is to avoid packet replication by keeping track of packets already received by the router. It will be appreciated that the caching of packets is generally feasible only within low-bandwidth channels. Although restricted to symmetric networks, an alternative to packet caching is the use of reverse path forwarding, where routers only accept data packets from their successor to the packet source. Specifically, the information stored about a data packet p in $CACHE_i$ is as follows:

p.source—address of the sender;
p.pktID—identification number of the packet, assigned by the sender;
p.fragOffset—fragment offset in an IP datagram;
p.group—address of the multicast group;
p.xmtAdr—last relay node of the data packet; and
p.age—the time packet information is in cache.

The $MRT^g_i$ lists, for each multicast group address g known to router i, the following:

g.status—a bitmap indicating whether router is CORE or NON_CORE and if it is DUPLEX, SIMPLEX, or NOT_MEMBER;
g.group—address of the multicast group;
g.modified_flag—indication whether an update has to be sent with information about group g.

A router joins a group in simplex mode if it intends only to send traffic received from specific attached hosts or neighbor routers to the rest of the group, and it does not intend to forward packets from the group. Duplex membership implies that the router forwards any multicast packet for the group.

The list $N^g_i$ contains all neighbors that through updates are known to be mesh members of group g. It will be appreciated that even routers which are not mesh members update this list. When a nonmember router receives a join request, and this list indicates the existence of a neighbor that is already a member of the multicast group, the nonmember can become a member without the need to send the join request any further.

The table $AT_i$ has an entry for each of the multicast groups in which router i is a member. For each multicast group g, an entry in the AT specifies those neighbors that router i uses as its anchors for the group and whether the router has any local host that is a source or receiver of the group. An anchor for router i in group g is a neighbor router that is a successor (next hop) in the reverse shortest path to at least one source in the group g. Therefore, a router determines its anchor to a given source by using the unicast RT. In the example multicast mesh shown in FIG. 1, router f utilizes router g as an anchor for the group because of source h if g is the next hop to h in RT. It should be noted that a router does not maintain anchor information for each source in a group, and if a single anchor acts as a next hop for multiple sources, that anchor needs to be stored just once.

When $MRT_i$ or $AT_i$ is updated, router i sends a multicast routing update (MRU) to all its neighbors reporting changes in its group membership and anchors per group. An MRU contains one or more entries, and each entry specifies:

(1) a group address;

(2) an operation code specifying a quit notification, simplex membership notification, or a duplex membership notification; and (3) a list of anchors needed in membership notifications by router i for the group and/or the list of newly discovered data traffic source nodes in the group.

The main objective of communicating anchor information among routers is to prevent routers that are required by their neighbors to forward multicast packets from leaving groups prematurely.

In an ad hoc network, changes in multicast group memberships are preferably disseminated together with routing-table updates. Routers thereby receive reports from their neighbors and remember which neighbors belong to which group. To save bandwidth, routers should exchange multicast routing information in combination with their unicast routing-table updates. Hence, a routing-table update preferably consists of a unicast portion and a multicast portion. However, CAMP is described independent of the unicast routing protocol with which it is used.

A router may update its MRT or AT after topology changes and messages are received from its neighbors. The messages that may trigger an MRU, are MRU's received from neighbors that change group memberships, and ACK messages that change both membership and anchor information.

The lists $LS^g_i$ and $LR^g_i$ contain hosts directly connected to router i that are respectively transmitting and receiving data packets. The main purpose for maintaining $LS^g_i$ and $LR^g_i$ is to track whether there are senders still sending packets and receivers still willing to join the group. This information aids router i in deciding when it is appropriate to terminate membership to group g. When newly discovered local senders are inserted in $LS^g_i$, they will be included in a multicast routing update, which is propagated to the mesh. Local senders eventually age out and are removed from the list. If data traffic continues to be received, an aged-out sender will be added to $LS^g_i$ again, and another MRU message will be propagated in the mesh. This provides a way for routers in the mesh to periodically check their reverse paths to the sources.

The lists $PEND^g_i$ and $PENDPJ^g_i$ are temporary structures for tracking join and PJ requests that are still pending acknowledgement. Requests are held in these lists for a limited amount of time, after which they age out; whereupon only the initiator can retransmit the request a limited number of times. Another auxiliary list is $BK^g_i$, which is used periodically to store senders in group g that have packets in $CACHE_i$. From RT, router i determines the successor to each sender, and according to a given threshold, sends out heartbeats or a PJ requests when the number of data packets sent by the successor is under this threshold.

The information stored for each neighbor, or host h, is maintained in the lists $A^g_i$, $A2^g_i$, $N^g_i$, $LS^g_i$, $LR^g_i$, $PEND^g_i$, $PENDPJ^g_i$, and $BK^g_i$ is as follows:

h.address—IP address of the node;

h.sender—IP address of traffic source (used by $PEND^g_i$ and $PENDPJ^g_i$);

h.status—DUPLEX, SIMPLEX, or NON-MEMBER;

h.age—length of time node or request has been contained in the list.

Detecting the failure or addition of a link to a neighbor is part of the routing protocol used in conjunction with CAMP. To assure proper CAMP operation, it is necessary for the associated routing protocol to operate properly in the presence of router failures and network partitions. This requirement implies that CAMP may not be used in conjunction with a routing protocol that is based on the classic distributed Bellman-Ford algorithm, such as the routing protocol of the DARPA packet radio network, because it is prone to routing loops and count-to-infinity problems. However, several recent examples of routing protocols exist that may be used in conjunction with CAMP. It will be appreciated that through the addition of minor extensions, CAMP may be utilized with on-demand unicast routing protocols.

3. Basic Joining and Quitting Mechanisms

For the purposes of this section it is assumed that each router is capable of reaching at least one core of the multicast group, with an associated multicast mesh, to which it is attempting to join.

CAMP utilizes a receiver-initiated method for routers to join multicast groups. The receiver-initiated method differs from the join mechanism employed by the CBT protocol in a number of ways. A host first determines the address of the group it is required to join as a receiver. The host then employs that address to ask its attached router to join the multicast group. Upon receiving a host request to join a group, the router then determines whether to announce its membership in the group or to request being added to the group, wherein it utilizes CAM to select the core toward which the join request may be sent. In the CBT protocol, joining a group always implies a request to join, and a router selects the relay of a join request as the neighbor router along the shortest path to the group core.

If a router joining a group has multiple neighbors that are duplex members of the multicast group, then the router simply changes its MRT and directly announces to its neighbors that it is a new member of the multicast group using an MRU. The announcement states whether the router is a simplex or duplex member. If MRU messages are sent reliably (depending on the unicast routing protocol), the neighbor nodes acknowledge the join announcement. If MRU messages are sent unreliably, the join announcement is sent periodically, so that neighbors learn about the join over a period of time.

If a router joining a group has no neighbors that are members of the multicast group, then it selects its successor to the nearest core as the relay for the join request. After the router selects a relay, it sends a join request to all its neighbors. A join request specifies the intended relay, the address of the multicast group that the sending router needs to join, and whether the router wants to join in simplex or duplex mode.

After sending a join request, a router then waits for the first acknowledgment to its request, and subsequently may retransmit the request after a request time out occurs. The router persists in sending the join requests for a predetermined number of times, for example four times, insofar as the unicast RT continues to indicate that physical paths exist toward any of the group cores, and none of its neighbors are group members. Each retransmission of a request is addressed to an intended relay whose selection was previously described. The procedure is somewhat similar to the basic mechanism used in the CBT protocol; however, since data packets flow along different paths over the multicast mesh depending on the source, there is no requirement to ensure that a single loopless path has been established to the chosen core. It will be appreciated, therefore, that the utilization of selected relays toward any core simply limits the search from the routers toward the multicast mesh, and that the ability to reach a core is not necessary for joining a group.

Any router that is a regular member of a multicast group and receives a join request for the group is free to transmit a join acknowledgment (ACK) message to the sending router. An ACK message specifies the sender of the join request and the multicast group being joined. To reduce channel traffic, the router specified as the relay of a join request can be allowed to reply first by means of a time out mechanism after a join request is received.

When the origin, or a relay of a join request, receives the first ACK to its request or the first ACK to a join request for the same multicast group, the router becomes part of the multicast group. In the case of a relay, the router sends an ACK to the previous relay or origin of the join request, even if that neighbor has already sent an update stating that it is a member of the multicast group.

FIG. 3 exemplifies a procedure for handling incoming join requests within the router receiving the join request. It will be appreciated that this code fragment, and others described herein, are provided by way of example and not limitation, whereas the general functionality according to the present invention may be derived from variously implemented procedures. In the depicted code fragment, i represents the router processing the request, that initially performs a check on a possibly looping request. The operation "^" is a test-and-set operation, where a bit is set to one only if it was previously set to zero. After verifying group and core information, the router further processes the request depending on the type of membership it has such as duplex, simplex, or no membership. FIG. 4 illustrates the handling of incoming join requests by simplex routers or routers that are not members of the multicast mesh.

Receivers utilize a slightly different procedure to leave a multicast group in CAMP than in the CBT protocol. A router leaves a multicast group when none of its hosts are members of the group, and it has no neighbors for whom it is an anchor.

A router leaving a multicast group issues a quit notification to its neighbors. Each neighbors in turn can update its MRT accordingly. No acknowledgments are requested for quit notifications, because in contrast to multicast routing trees multicast meshes do not dictate the paths taken by multicast packets. Quit notifications are preferably sent in combination with multicast routing updates.

In an ad hoc network, it is likely that the routers serving as access points to the remainder of the network would serve as cores, because they are static and must be known by the remainder of the ad hoc network for other purposes. It will be appreciated that within CAMP, the cores are allowed to leave multicast meshes under the condition that they are not being used as anchors by a router. For example, when they are not needed to provide efficient paths for the dissemination of packets in the multicast meshes of the groups.

In the multicast mesh example shown in FIG. 1, the core router may leave if b and d are not utilizing it as an anchor, which can occur if c joins the multicast mesh. An approach which favors noncore routers as anchors can be provided by employing a routing protocol that provides multiple paths to the same destination and requires CAMP to utilize noncore successors whenever possible.

4. Simplex Joins

If nonmember routers are allowed to send packets to a multicast mesh, the only path for reaching the mesh without flooding would be through one of its cores. Accordingly, cores could become hot spots if multiple nonmember sources exist, and the paths followed by the packets sent by those sources may be very inefficient due to router mobility in an ad hoc network. Unlike other protocols that allow nonmember routers to send packets to a multicast tree for dissemination within the tree, CAMP requires that the router attached to any source of packets for the group join the multicast mesh. To avoid the dissemination of multicast packets to routers that join a group only to allow a source-only host to send packets to the group, CAMP allows routers to belong in a multicast mesh in simplex mode rather than as regular members. This characteristic of mesh members is utilized during packet forwarding to avoid the dissemination of data to sender-only routers.

In order to adapt also to bursty traffic, the router connected to the source host does not discard data packets until it receives an acknowledgment for its join request in simplex mode. The router encapsulates data packets into multiple copies of its simplex-mode join requests. The encapsulated packets are sent toward the core in like manner with other join requests. To minimize the chances of making the core a hot spot, the first router in the path from the source of data traffic to the core that is already a member starts forwarding the data packets itself. In the worst case, with all routers along the path to the core being nonmembers of the mesh members, the core has to be involved in the packet forwarding while the router closest to the core gets its acknowledgment to the join request.

Figure 5:
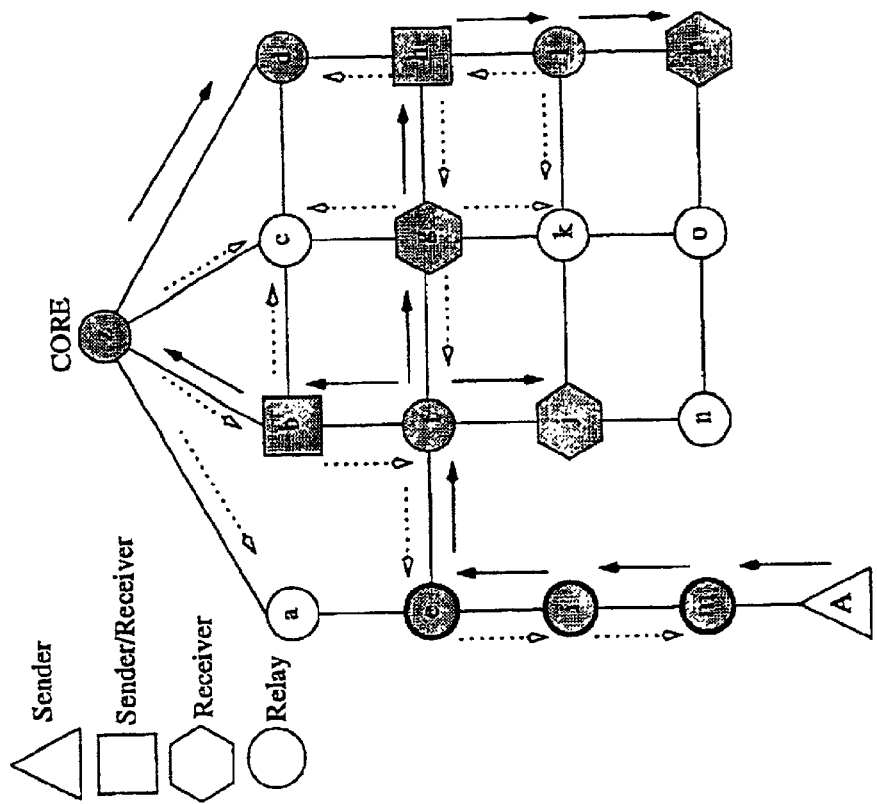
FIG. 5 is a traffic flow diagram between routers in a multicast mesh operating according to an embodiment of the present invention, showing incoming traffic flow from nonmember routers.

FIG. 5 and FIG. 6 provide a comparison of a CAMP multicast mesh in FIG. 5 to a similarly shaped shared-tree in FIG. 6, which is illustrative of certain benefits derived by requiring members to forward data in one direction only. In the CAMP multicast mesh of FIG. 5, routers m, i, and e join the group in simplex mode and forward traffic from host "A" to the remainder of the mesh. In contrast, in the shared-tree protocol of FIG. 6, routers m, i, e, and a forward packets from host "A" to router z, the core, and would not join the group. It is clear from this example that the approach used in CAMP leads to shorter delays in the distribution of packets from nonmember hosts and reduced congestion at the core routers. Furthermore, due to the simplex memberships within the mesh, traffic from other sources does not flow to nonmember sources. Dotted arrows within the figure are again utilized to indicate overhead traffic due to the broadcast characteristics of the communication channel, and solid arrows indicate the traversal of packets accepted at each relay and end point. Simplex routers are shown in bold circles. It will be appreciated that cores utilized within CAMP are not required to be part of a multicast mesh. In FIG. 5, CAMP's multicast mesh could exist even if z were not part of it because traffic flows along reverse shortest paths and source-only nodes are part of the mesh through unidirectional paths. Contrast that with an example of the CBT protocol, wherein the core is contacted by traffic from source-only nodes, and the shared-tree breaks when the core fails. Considering the shared-tree example of FIG. 6, it will be appreciated that the node must be a member of the shared-tree if traffic from nonmembers is to be propagated to the multicast group.

5. Heartbeats, Push Joins, and Anchors

CAMP ensures that all the reverse shortest paths between sources and receivers are contained within a group's mesh by means of heartbeat and PJ messages.

Periodically, every single entry in the packet forwarding cache is verified. The router looks up its RT to check whether the neighbor that relayed the packet is the reverse path to the source for every cache entry. A heartbeat message, or a PJ, is sent toward every source stored in the cache that had the number of packets coming from the reverse path under the given threshold.

A router receiving a heartbeat for a given multicast group and source retransmits the heartbeat if its successor toward the source of data traffic (determined with the unicast routing protocol) is already a mesh member. When a member router receives a heartbeat and detects that its successor is not part of the multicast mesh, it sends a PJ message to that neighbor router and waits for an ACK from that router. FIG. 7 illustrates the processing of an incoming PJ, wherein after checking for a possible PJ request loop, the procedure checks whether the local router is directly connected to the source of data traffic. If so, an appropriate acknowledgment will be sent toward the initiator of the request. Otherwise, the PJ request must be sent further ahead until it reaches the router directly connected to the source, which is illustrated in FIG. 8.

Alternatively, if the reverse-path successor for a source of an accepted multicast packet is not a mesh member, the router sends a PJ to that neighbor router and waits for an ACK from that router. A router retransmits a PJ after a request time out and persists in sending the PJ until the unicast RT indicates that no path exists to the origin of the heartbeat. If an ACK to a PJ is needed from a neighbor and the link to that neighbor fails, the router sends a new PJ to a different neighbor using the updated information in its unicast RT.

A router that receives a PJ sends an ACK under the following conditions: (a) it is the intended relay; (b) it is already a member of the group specified in the PJ; and (c) it has a path to the end point of the PJ. CAMP determines two types of PJ acknowledgments, a regular ACK as sent by duplex members, and an ACK_SIMPLEX as sent by simplex members. Preferably, simplex mesh members are not allowed to accept packets received from duplex members to prevent interleave of duplex and simplex routers between the initiator of a PJ request and the router directly attached to the source. When acknowledgments begin being received back from the source, duplex members respond by sending regular ACKs, and simplex members change to duplex when they receive a regular ACK. Therefore, if at least one duplex mesh member exists in the path from initiator to the source, all nodes from that duplex member and through to the initiator must become duplex if they have not become duplex already.

A router sending an ACK to a neighbor's PJ understands that it is a group anchor for that neighbor. A router receiving a PJ forwards it to the next relay under the following two conditions: (a) it is the specified intended relay, and (b) it has a path to the endpoint of the PJ. The relay specified in the forwarded PJ is the router's successor to the end point of the PJ. A router discards a PJ for which it is not the intended relay, or for which it is the intended relay but has no path to the end point of the PJ.

Heartbeats are sent while the reverse shortest path remains quiet, and anchor information is aged accordingly to account for changes which occur over time in the reverse shortest paths utilized for data distribution. The changes may occur, for example, as sources leave groups, or routers are moved. When a router stops receiving traffic, it obviously stops forwarding data packets; which causes a portion of the anchors stored at member routers to age out, which in turn reduces the number of copies of the same multicast packets from other sources received by certain routers and may also allow other routers to leave the group.

After topology changes, the reverse shortest paths from sources to members of the group change, which causes a portion of the anchors stored at routers to become obsolete. However, packet forwarding in CAMP depends only indirectly on the reverse-path information obtained from the unicast RT's of a router. Anchor information is utilized principally to prevent routers from leaving a multicast mesh when they are positioned in the path between sources and receivers in the mesh, and packets flow along the shortest paths within the mesh. Accordingly, it is acceptable for a router to attempt to add anchors as quickly as possible, such as immediately upon detecting a heartbeat from a router for which the successor is not in the multicast mesh, and to wait for anchor information to age out for deletion.

Router i can add a neighbor p as an anchor for group g in two ways after receiving a heartbeat or a PJ associated to a given source S in g:

(1) when p forwards an acknowledgment to the PJ and is also the successor for i in the reverse path to source S (when router i forwards the acknowledgment, it also sends a multicast update if p became an anchor); and (2) when router i gets data packets from router p, which is also a successor for i in the reverse path to source S.

Anchors are aged while they are stored in the AT and MRT, and are erased when they reach a zero age. A router can leave a multicast mesh when its MRT indicates that it is no longer being utilized as an anchor by any neighbor, and it has no attached hosts which are senders or receivers of the group.

6. Handling Topology Changes

6.1. Link Failures

Link failures are not very critical in CAMP. When a link fails, breaking the reverse shortest path to a source, the router affected by the break may not be required to take any action, because the new reverse shortest path may already be a part of the mesh. Furthermore, packets keep flowing along the mesh through the remaining paths to every receiver. In contrast, if any branch of a multicast tree fails, the tree must reconnect every components within the tree for packet forwarding to continue to all receivers.

Link failures produce fewer negative effects in CAMP than in tree-based multicast protocols; because (1) a router joins a group with the first ACK it receives from any neighbor, and (2) a router persists in joining while it has neighbors that are members of the mesh or while its unicast RT provides a path to a core. Furthermore, core failures do not interrupt packet forwarding in the mesh or the ability of new members to join a group, because ERS can be utilized to reach a multicast mesh when cores are not reachable, and cores need not be part of the mesh. In contrast, failure of the core or the rendezvous point of the group within tree-based multicast routing protocols which are based on receiver-initiated joining, such as CBT and protocol independent multicast-sparse mode (PIM-SM), causes breakage of the multicast tree and prevents new members from joining until a new one is elected and made known to all routers.

6.2. Node Failures

CAMP reduces control traffic associated with the establishment and maintenance of multicast meshes by utilizing multiple cores per group that routers can employ as landmarks for orienting join requests. Therefore, a router can attempt to join a mesh by orienting its unicast join requests to any of such landmarks, and can redirect its join requests when topology changes occur. If none of the cores of a group are reachable given the unicast routing information currently available when a router needs to send a join request, this router uses an ERS to reach the mesh. The router first sends a mesh search message specifying itself as the requester. Any router receiving such a message forwards it, appending its own ID to the path of the message, if the ERS can proceed and the router is not a member of the mesh. A router that receives the mesh search message and is a mesh member replies with an acknowledgment. When the mesh search requester gets the first acknowledgment to its message, it sends a join request along the path it obtained with the acknowledgment. The router retransmits its search message after a time out if it does not receive an ACK.

As a result, CAMP has no single point of failure and can utilize as many cores as desired for a given mesh. In contrast, if a multicast tree is provided at all within the CBT and PIM-SM protocols, it is necessary that a single core be utilized, so as to detect loops and partitions in the multicast tree. When the single core experiences a failure, ERS may then be utilized to remap. It will be appreciated, however, that CAMP remains a more efficient approach since ERS's are utilized less often due to the multiple cores provided by CAMP wherein no single point of failure exists. A proposal to accommodate multiple cores while still providing multicast trees has recently been proposed, however, the mechanisms described in the proposal may be excessively complex for use within a dynamic network, and no similar solutions have been proposed for ad hoc networks.

6.3. Keeping Meshes Connected

A multicast mesh may be partitioned due to the mobility of routers or the partition of the network itself. In such a case, CAMP has the ability to continue the operation of all mesh components, because routers do not rely on a single core to join the mesh. In any tree-based protocol which utilizes receiver-initiated joining, the tree component including the core or rendezvous point can continue to operate, while the other must terminate the multicast group, or for example employ ERS for every join request, until a path to the core is reestablished.

In addition, CAMP is able to merge mesh components as long as there is physical connectivity between mesh components. The mechanism utilized to accomplish this is simple and is based on requiring each router to maintain a record of every core in a multicast group, even when the cores are not reachable.

When a router looses connectivity with all the cores of a multicast group, it sets a reminder flag for contacting any such core at a later time when the unicast RT indicates that at least one core for the group is reachable. When a router detects that connectivity with at least one core of the multicast group is reestablished, it determines if its successor in the reverse shortest path to the core is within the mesh, and sends a join request toward the core if the successor is not in the mesh, wherein the multicast mesh can be reconnected.

To ensure that two or more mesh components with cores eventually merge, all cores that are active in the mesh periodically send messages to one other, forcing routers along the path that are not members to join the mesh. These messages are core explicit joins (CEJ) that specify the multicast group, the intended relay of the CEJ, the intended core, and a gap flag. The flag is information used by the receiver of a CEJ to determine whether there are nonmembers in the path between two cores. When the flag is maintained in a reset state all along the path between the two cores, no acknowledgment to CEJ needs to be returned.

A router receiving the CEJ with the gap flag set to zero forwards the CEJ to the next relay if: (a) it is the specified relay, and (b) it has a path to the specified core. Furthermore, if the relaying router is not a member of the mesh, it sets the gap flag to one in its CEJ.

A core receiving the CEJ with the gap flag set to one sends an ACK. The ACK is subsequently forwarded all the way back to the core that originated the CEJ, wherein the ACK messages force the relaying routers to join the mesh, as in a PJ or a regular join. Alternatively, a router receiving the CEJ with the gap flag set to zero forwards the CEJ to the next relay if: (a) it is the specified relay, (b) it has a path to the specified core, and (c) it is not a member of the group.

A similar mechanism is preferably utilized to ensure that a connected component of a group mesh with no cores in it can merge itself with at least one other connected component with one or more cores in it. When a router that has group members or is an anchor for other routers detects that none of its successors in its shortest path to any core of the group is part of the mesh, the router simply sends a join request toward its selected core. Routers under CAMP utilize flooding (use of ERS's) to reconnect the mesh only if all cores are unreachable.

7. Packet Forwarding Over a Multicast Mesh

The basic packet forwarding method utilized in CAMP consists of trying to forward multicast data packets along the paths within the mesh that first reach the member routers from the sources. The main control information in a multicast packet preferably comprises:

(1) address of the intended multicast group;
(2) address of the sending host;
(3) a sequence number that is used for control functions; and
(4) a life span which limits the time each packet is allowed to remain in the network.

A router attached to the source host of a packet simply transmits the packet to its neighbors. A router receiving a multicast packet without errors from a neighbor router accepts the packet only if:

(1) sending router is a member of the multicast group specified in the packet, which is determined from the router's MRT;
(2) packet's sequence number is not in the packet-forwarding cache (for a duplex router); and
(3) packet's sequence number is not in the packet-forwarding cache and the neighbor sending the packet is also a simplex router (for a simplex router).

When a router accepts a packet, it adds its sequence number and the identifier of the source to its packet forwarding cache. This step prevents the same packet from being accepted more than once by the router, provided that the entries in the cache persist longer than the time it takes for packets to revisit a router. Experiments performed in association with this invention utilizing an ad hoc network built using commercial radios operating in an ISM band with a data rate of one megabit per second (1 Mbit/s), indicate that small packet-forwarding caches suffice, such as those listing fewer than one hundred entries, because each router receives few multicast packets per second, due to limits imposed by channel access and pacing of transmissions over multiple hops, and a successful packet traverses the longest network path in substantially less than two seconds.

A router accepting a multicast packet is not required to forward the packet any further, unless the router is an anchor in the multicast group for at least one neighbor. It should be noted that routers having source-only hosts attached do not receive multicast traffic from other sources in the group, unless they have connectivity with duplex members.

Whether a router forwards a packet or not, the router updates its MRT with a flag indicating that the sending router belongs to the multicast group addressed by the packet. Should the router desire to subsequently join the group, this information allows the router to join through a simple announcement.

A few aspects of CAMP's packet forwarding discipline should be recognized. CAMP typically forwards packets along the fastest obtainable routes from sources to receivers within a multicast mesh at the time the packet is being forwarded. If link asymmetries are not substantial, the shortest paths within a mesh tend toward being equivalent to the true shortest paths, because a mesh is built ensuring that all reverse shortest paths are part of the mesh. A rare case can occur in which packet forwarding would not take place along the shortest paths of the mesh when a given router is not an anchor for any neighbor, and yet is part of the shortest path within the mesh from some source to one or more receivers.

8. Performance Comparison 8.1. Protocol Used for Comparison

CAMP provides sender-initiated joining within a scalable network mesh for large ad hoc networks that is presently unknown in the industry. For comparison purposes, the closest related protocols known are based on routing trees are DVMRP and PIM-DM; an example of this type of protocol based on graphs, other than trees, is FGMP. A principle reason these protocols are not scalable is that sources must flood either data packets or control packets to the entire network in order to establish a routing structure. If the network size is large, or the number of groups and sources per group is large, the overhead readily becomes excessive.

At present, CAMP is the only protocol which provides for multicast routing that is not based on trees, and that avoids flooding the network with data or control packets to establish the routing structure for a group. For comparative purposes, a simple tree-based protocol was implemented for capturing all the features of the main tree-based multicast protocols having receiver-based joining that have been proposed or implemented to date, in addition to ODMRP. The objective of the simulation experiments was to compare the mesh approach used by CAMP with the approaches utilized in ODMRP and FGMP.

A shared-tree multicast routing protocol was implemented which is similar to CBT in that it uses a single core within that tree to forward packets. A router in this protocol, utilizing a wireless tree-based protocol is denoted herein as WTP, forwards datapackets on the condition that they are received from a child or parent of the router in the tree rooted at the core. The tree-maintenance part of WTP extends the conventional shared-tree protocols like CBT and PIM-SM. In WTP, a router reestablishes its connection to the tree by searching for a new parent as soon as it detects that its previous parent has moved away.

8.2. Experiments

The results from the simulation experiments indicate that CAMP rebuilds meshes at least as fast as CBT and PIM can rebuild trees and requires storage overhead similar to any protocol based on shared trees. CAMP, however, is inherently loopless, provides a robust protocol by forwarding packets around failed links of a mesh, and is resilient to any core failure and network partitions. In contrast, CBT and PIM incur temporary loops when the unicast RT's are inconsistent, and stops packet forwarding to segments of the group after link failures occur until after the multicast tree has been rebuilt, and is vulnerable to core or rendezvous point failures. Furthermore, in a static topology, CAMP delivers packets along the shortest paths defined within a multicast mesh, which is built based on reverse shortest paths, which are also utilized by PIM dense mode and DVMRP to build source trees. Therefore, the paths obtained in CAMP for static topologies are similar to those obtained with source trees and can be substantially shorter than the paths obtained with shared trees, such as CBT.

Although CAMP and ODMRP use a different mesh approach, they share some common features. The concept of anchors is present in both protocols. When a router reads in a member table to determine if it has to set the forwarding flag, the router is becoming an anchor for the neighbor sending the member table. Rather than utilizing reverse path forwarding, both protocols rely on packet caching to avoid loops. A major difference is the sender-initiated approach used in ODMRP, which additionally requires that control packets flood the network.

Perhaps the most important aspects of the performance comparison between CAMP and the other multicast protocols are illustrated by the average delays, percentage of packet loss incurred due to node mobility, and the number of control packets received by each node. The percentage of packets lost at a receiver is simply the amount of packets sent by the traffic source that were not seen by the specific receiver. Therefore, the smaller the percentage is, the better the protocol behaves. Obviously, the average packet delay measured at each receiver excludes lost packets. The reason for using the number of incoming control packets as an overhead metric rather than the number of bytes in those packets is due to the fact that the MAC layer being utilized is based on floor-acquisition. This type of MAC protocol is heavily dependent on the number of packets sent and less affected by the number of bytes sent, since the access to the physical channel is assigned for some time to a packet regardless of its size.

Figure 9:
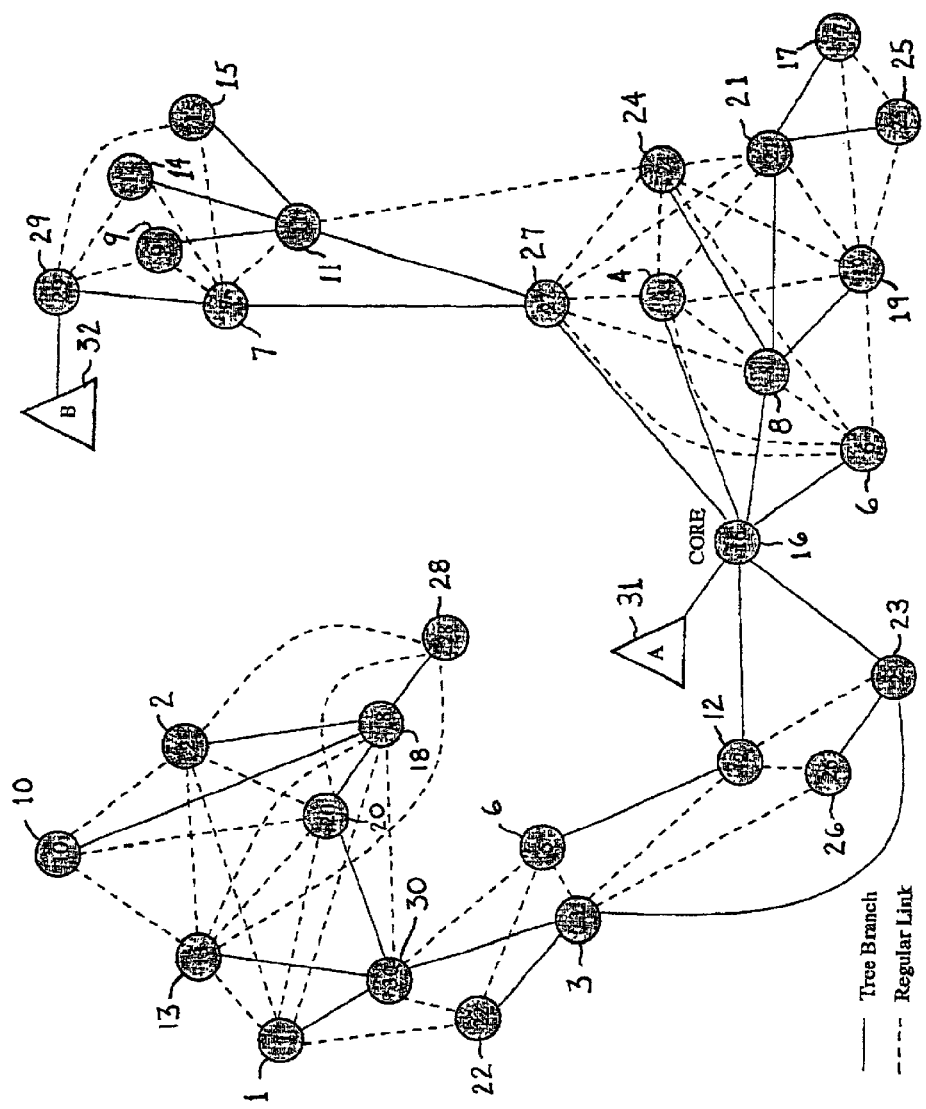
FIG. 9 is a network topology diagram for an ad-hoc network utilized for comparative simulations of various router protocols, shown with thirty routers and a pair of traffic sources.

A number of experiments were performed to study this aspect of CAMP's performance and to compare it against the other multicast approaches. The simulation package utilized was the "C++ Protocol Toolkit (CPT)", from Rooftop Communications™. FIG. 9 illustrates the topology of the dynamic network used in the simulations. The network has thirty routers, numbered from 1 to 30, and two senders, "A" and "B". The specific positioning of sources should not be an issue for mesh-based protocols, so the sources were positioned in different parts of the network to study the behavior of WTP when traffic comes from sources both close and farther away from the core. The solid links shown in the diagram illustrate the initial shared tree computed dynamically in the simulation. The dashed links represent the connectivity among nodes. All nodes in the simulation of the multicast routing protocols are receivers, which in CAMP translates to having all nodes being duplex members. Router 16 was chosen as core for all simulations.

Experiments were run for a period of three hundred and fifty seconds (350 S), and identical conditions were applied to the simulation runs for CAMP, WTP, and ODMRP. Specifically, the same number of packets were sent from the given source, the same router mobility was applied, and the same MAC and routing protocols were utilized. The simulations employed a single broadcast channel, so that the transmission of a node is received by all its neighbors. The channel bandwidth was selected as one megabit per second (1 Mbit/s). The floor acquisition multiple access (FAMA) protocol was used to access the broadcast channel, and the wireless Internet routing protocol (WIRP) with hop count as distance a metric was utilized to generate the unicast routing-table entries at routers for CAMP and WTP. Since CAMP coexists and sends its updates embedded into the updates of WIRP, the number of incoming control packets shown by CAMP in the experiments includes the control packets generated by the unicast routing protocol. ODMRP does not require a unicast routing protocol. Radio links are bidirectional.

The update timers in CAMP and sender advertisements in ODMRP determine the speed with which the network adapts to topological and group membership changes. Although the draft specification available for ODMRP requires this timer to be set to four hundred milliseconds (400 ms) and does not clearly indicate a way to compute this timer for different network sizes and capacities, the update timers for both protocols have been set to three seconds (3 s). The choice of three seconds is an attempt to be fair to the sender-initiated protocol, since three seconds is the time period utilized by CAMP for sending updates. Naturally, if the timers are set to four hundred millisecond (400 ms) the overhead presented by ODMRP is expected to be increase substantially.

Two major types of experiments were run regarding mobility: one with fifteen routers and the another with utilizing only five routers which moved through the network. When only five routers are mobile, those being routers 17, 18, 20, 28, and 30, and other than these five routers, routers 1, 3, 6, 7, 9, 10, 19, 23, 25, and 27 are the mobile routers for the more dynamic scenario. The mobile nodes were chosen randomly by a topology generator bundled with the simulation package used. The speed at which mobile nodes moved randomly in all simulations was sixty seven point five miles per hour (67.5 mi/hr, or 30 m/s).

In the experiments, data traffic is originated either by source "A", which is directly attached to the core (router 16), or by both source "A" and "B", which are attached to router 29. In the experiments where the source of data traffic is sender "A", the load was four packets per second (4 packets/s). In the experiments where both senders "A" and "B" transmitted packets, each one sent two packets per second (2 packets/s) in an attempt to maintain the same number of data packets in the network.

Figure 10:
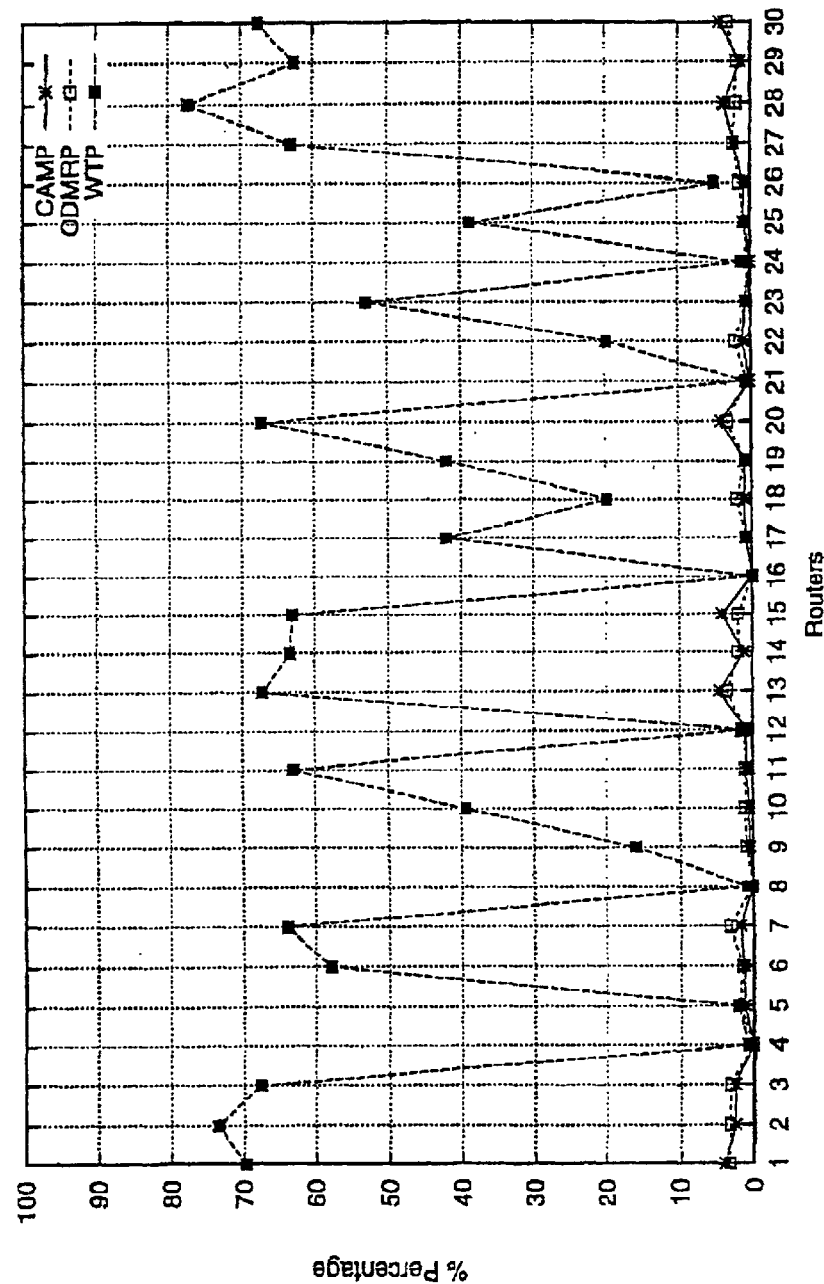
FIG. 10 is a graph of percentage packet loss within the network of FIG. 9 having fifteen nodes mobile, for the protocols WTP, ODMRP, and CAMP.

Not surprisingly, WTP was the protocol that performed the worst in the experiments. FIG. 10 is a graph showing the different outcomes between WTP and the mesh-based protocols regarding packet losses. WTP attempts to reconnect the tree as soon as possible every time a router loses its parent in the shared tree. Every time the unicast routing protocol warns WTP about a neighbor being removed from the unicast RT, the protocol sends a join request to the new successor to the core, trying to reestablish its connection to the tree. The same trend shown in FIG. 10 for packet losses was observed in all experiments we ran. In such a context, the comparison of average packet delays between the shared-tree protocol and the mesh-based protocols cannot be made, since the averages for the routers running WTP is computed based in much less data packets than in CAMP and ODMRP, which is also shown in another work. Therefore, for the sake of brevity, we do not include WTP results in the following figures.

The reason for the poor behavior of WTP is the strong dependency it has on consistent unicast RT's to provide a loop-free shared tree. WIRP, the unicast routing protocol used in the experiments, may create temporary loops shortly after links go down. As a result of WTP making decisions regarding tree reconnection shortly after links go down, the shared tree becomes vulnerable to loops, which leads in-turn to the larger packet-loss rate. This result highlights the difficulties created when packet forwarding is dictated by a strict delivery structure, such as utilized within a shared tree in a dynamically changing environment. Protocol behavior in the presence of temporary loops in unicast routing also illustrates the survivability of mesh protocols.

Figure 11:
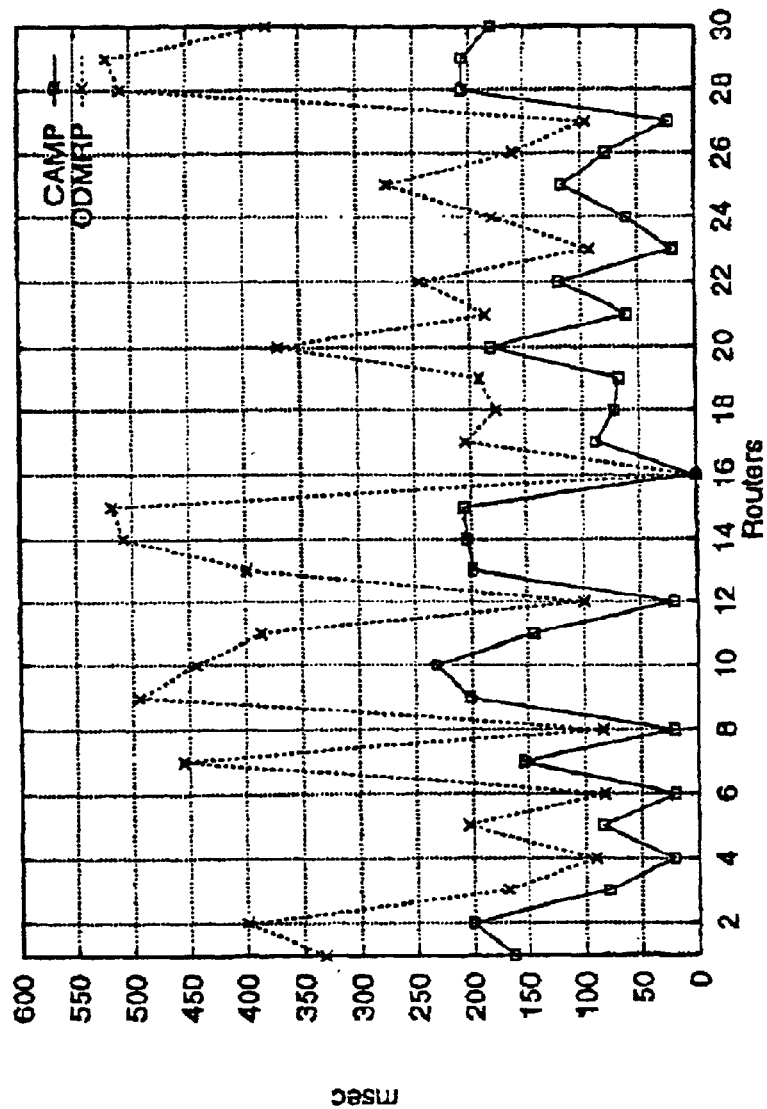
FIG. 11 is a graph of average packet delay with five nodes mobile and utilizing a single source "A" showing a comparison between ODMRP and CAMP protocols.
Figure 12:
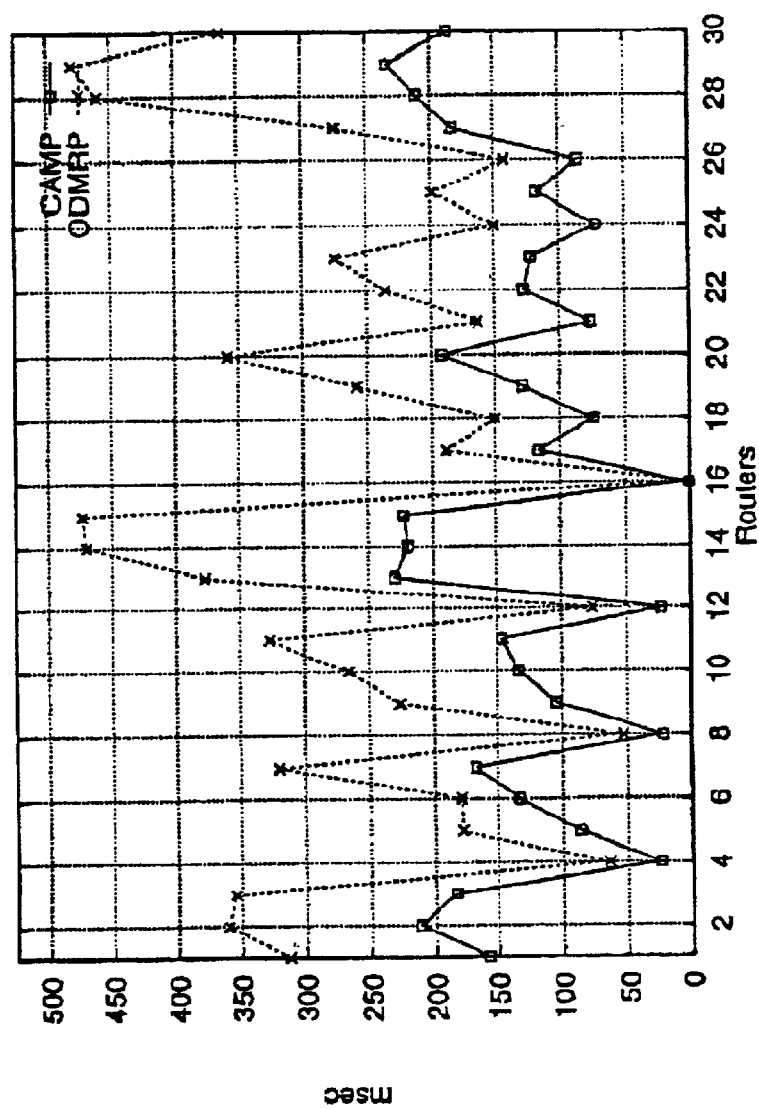
FIG. 12 is a graph of average packet delay with fifteen nodes mobile and utilizing a single source "A", showing a comparison between ODMRP and CAMP protocols.
Figure 13:
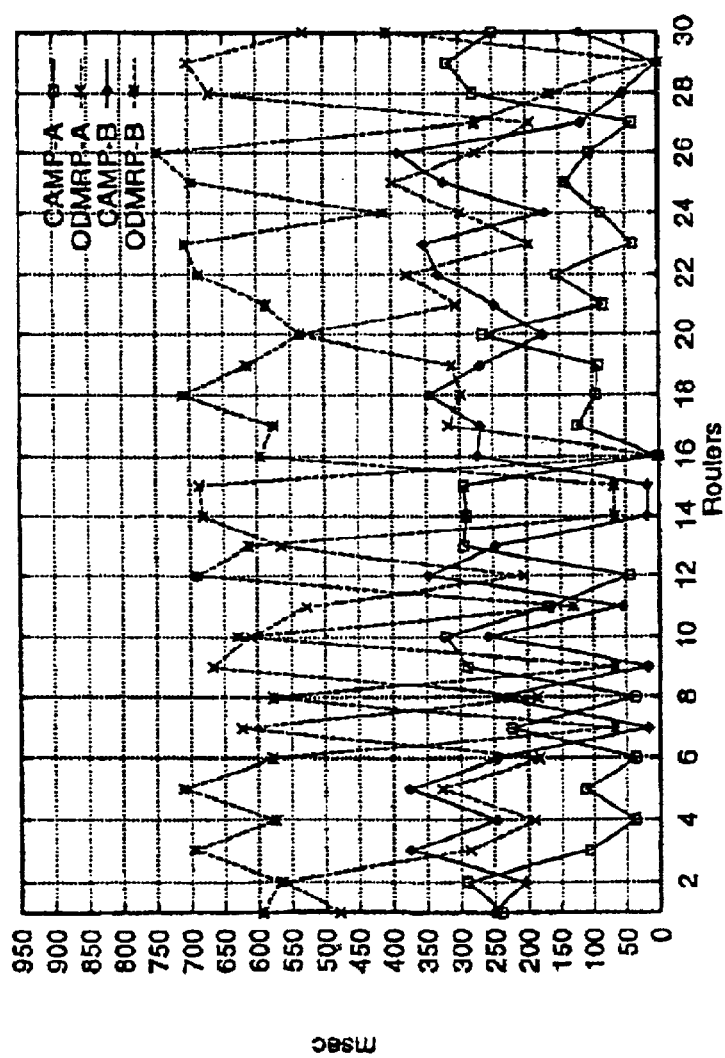
FIG. 13 is a graph of average packet delay with five nodes mobile and utilizing a source "A" and source "B", showing a comparison between ODMRP and CAMP protocols.
Figure 14:
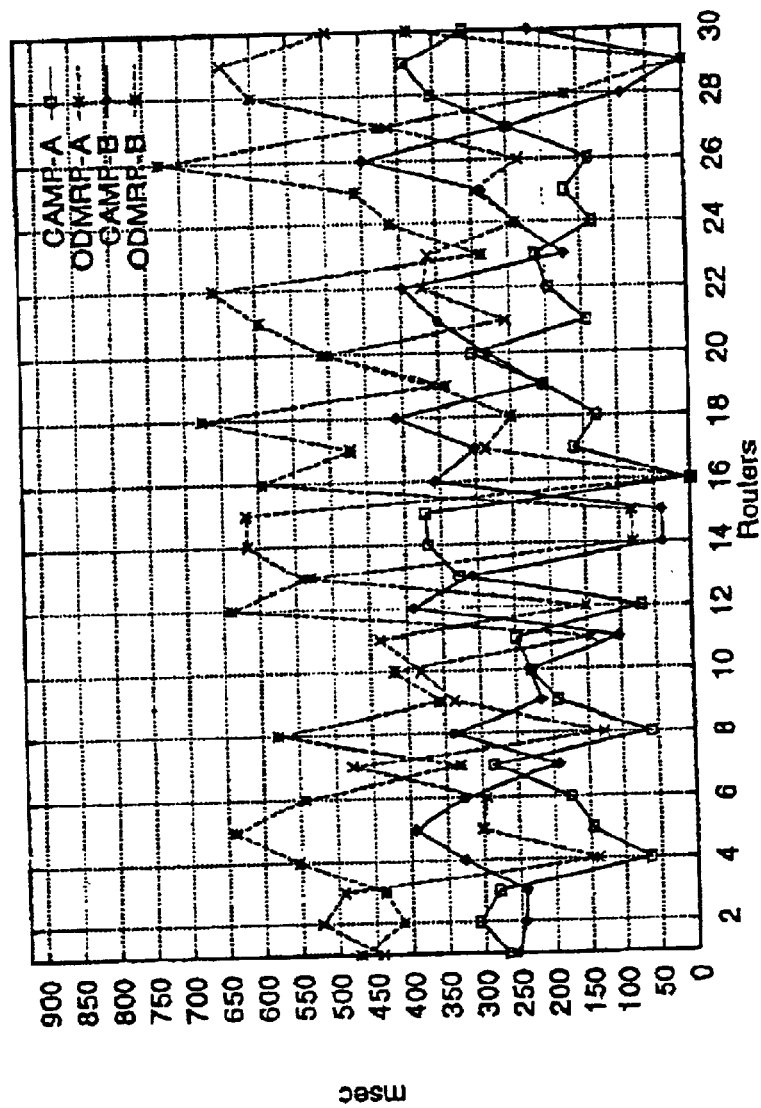
FIG. 14 is a graph of average packet delay with fifteen nodes mobile and utilizing a source "A" and source "B", showing a comparison between ODMRP and CAMP protocols.
Figure 15:
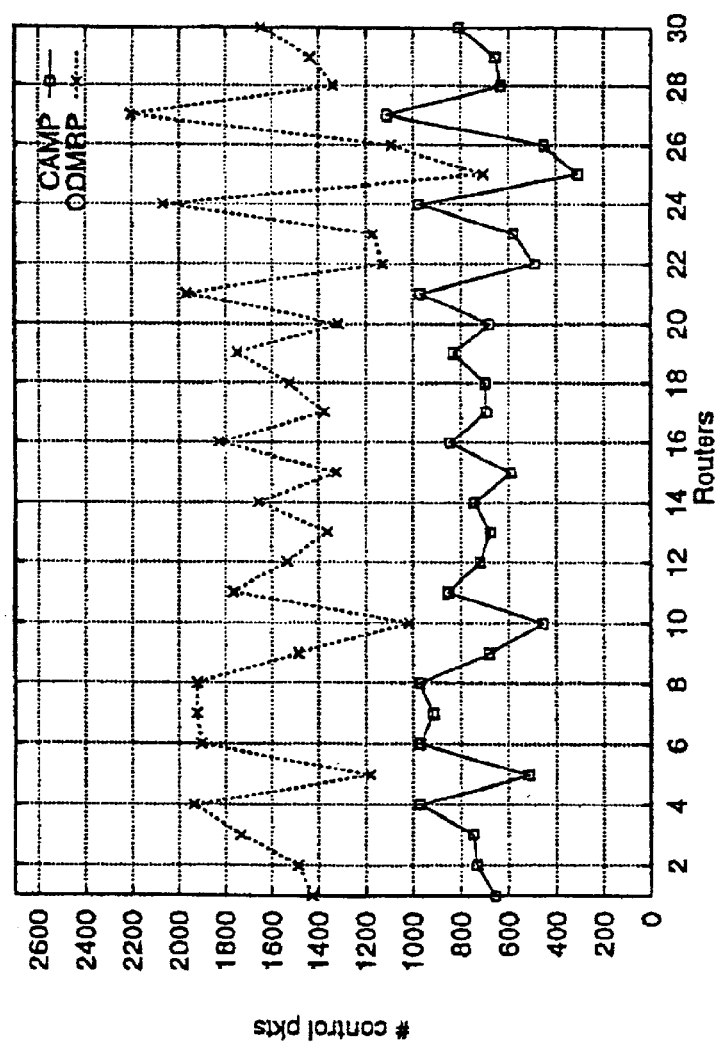
FIG. 15 is a graph of total control packets received by each router of FIG. 9 with five nodes mobile and utilizing a single source "A", showing a comparison between ODMRP and CAMP protocols.
Figure 16:
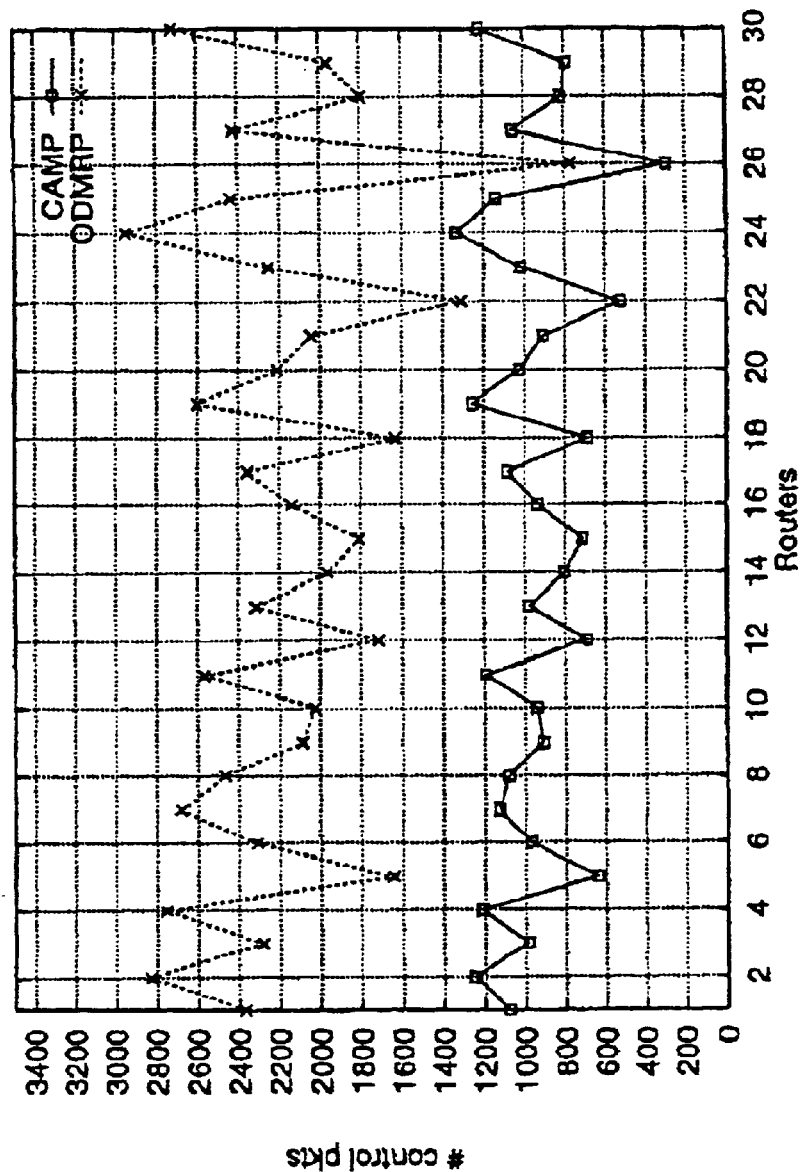
FIG. 16 is a graph of total control packets received by each router of FIG. 9 with fifteen nodes mobile and utilizing a single source "A", showing a comparison between ODMRP and CAMP protocols.
Figure 17:
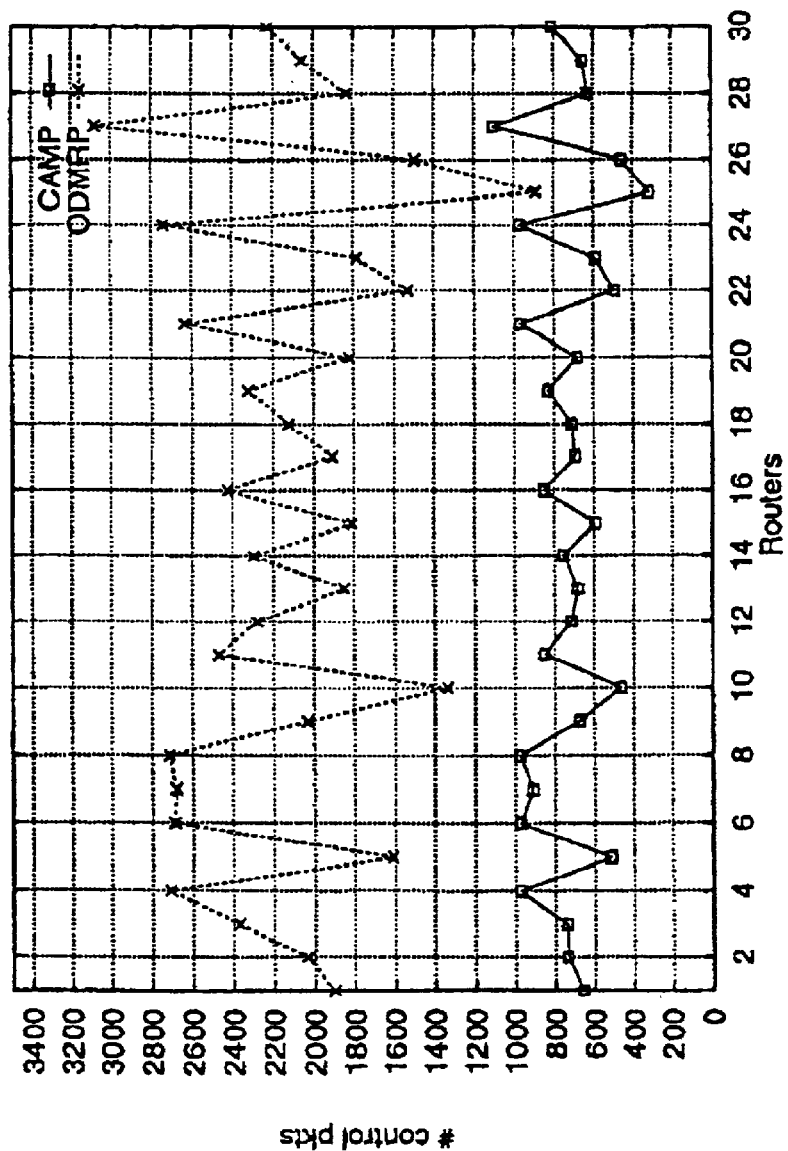
FIG. 17 is a graph of total control packets received by each router of FIG. 9 with five nodes mobile and utilizing a source "A" and source "B", showing a comparison between ODMRP and CAMP protocols.
Figure 18:
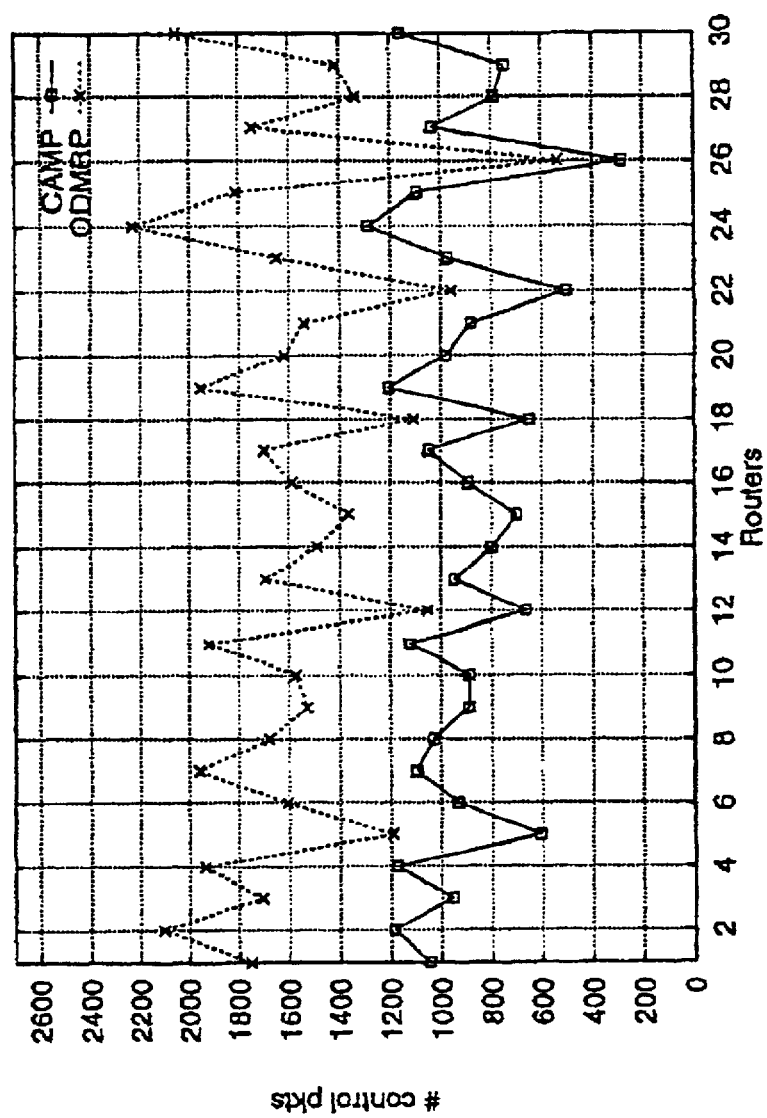
FIG. 18 is a graph of total control packets received by each router of FIG. 9 with fifteen nodes mobile and utilizing a source "A" and source "B", showing a comparison between ODMRP and CAMP protocols.
Figure 19:
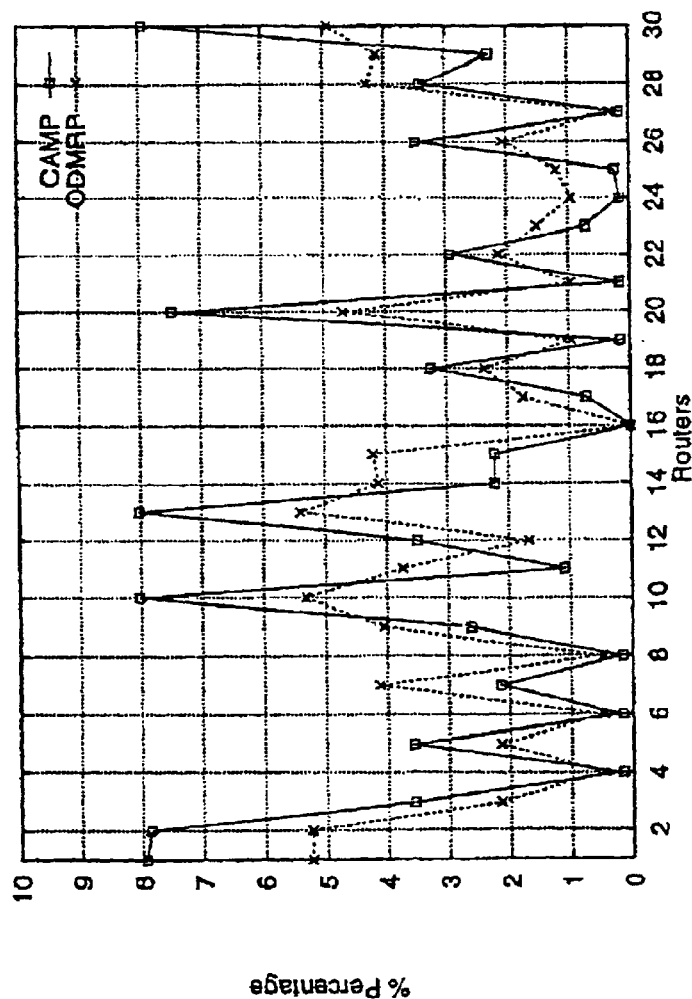
FIG. 19 is a graph of the percentage of data packets missed by each router within FIG. 9 with five nodes mobile and utilizing a single source "A", showing a comparison between ODMRP and CAMP protocols.
Figure 20:
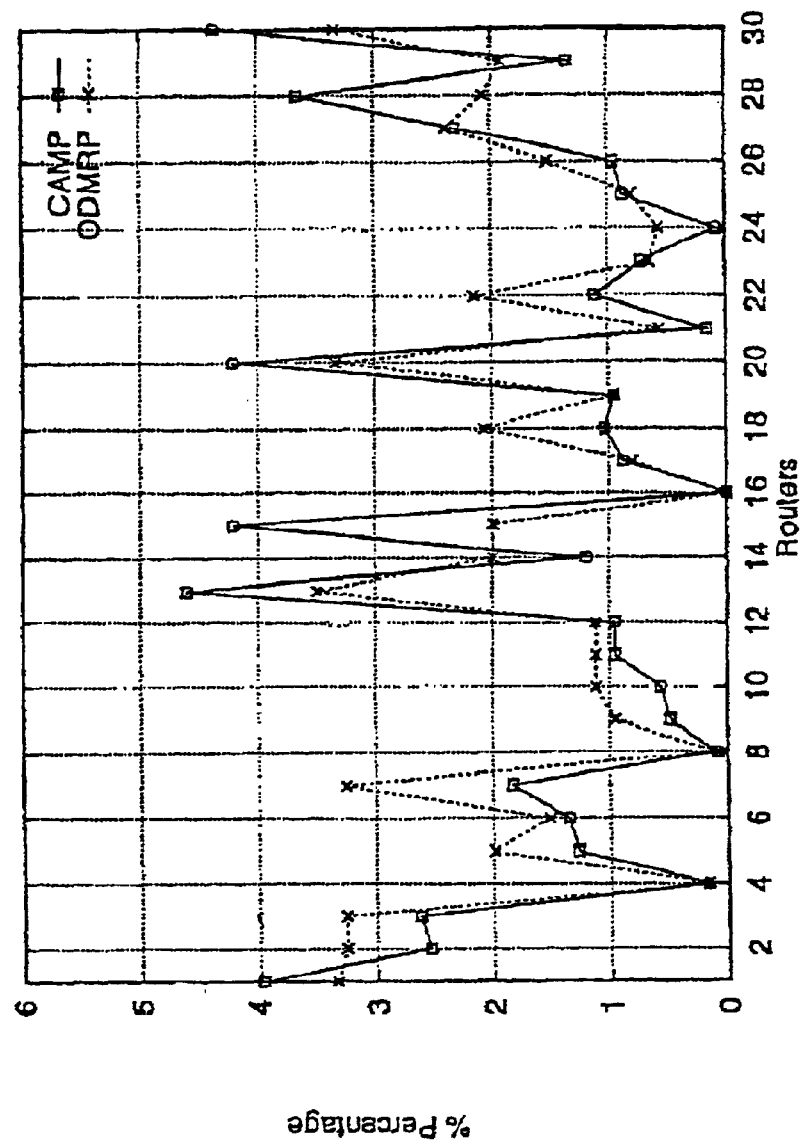
FIG. 20 is a graph of the percentage of data packets missed by each router within FIG. 9 with fifteen nodes mobile and utilizing a single "A", showing a comparison between ODMRP and CAMP protocols.

In FIG. 11 through FIG. 22 graphs illustrate various comparison between CAMP and ODMRP protocols as determined by the simulations. Router numbering 1 through 30 along the x-axis corresponds with the routers shown within the network topology depicted in FIG. 9. CAMP was found to exhibit reduced levels of delay in relation to ODMRP in the case of a single source "A" with five nodes in motion as shown in FIG. 11, and also with fifteen nodes in motion as shown in FIG. 12. When multiple sources, exemplified as source "A" and "B", sent packets the delays incurred by packets from each source are longer in ODMRP than in CAMP, and the increase in packet delays is more pronounced in ODMRP. The delays are shown with both five nodes in motion in FIG. 13 and with fifteen nodes in motion in FIG. 14. The longer delays incurred within ODMRP utilizing multiple sources, is considered to arise as a result of the flooding of control packets per source required by ODMRP. As shown in FIG. 15 through FIG. 18, the number of control packets received by CAMP routers represent only fifty to sixty percent (50–60%) of the number of packets seen by ODMRP routers. The reduced packet traffic required by CAMP is perhaps the principle reason for the longer delays exhibited by ODMRP. As the number of senders grows, the performance gain of CAMP over ODMRP becomes more pronounced. In FIG. 13 and FIG. 14, it can be observed that in similar manner to routers 1 and 2, almost half of the routers in the network show reduced delays for both senders "A" and "B" when running CAMP.

Figure 21:
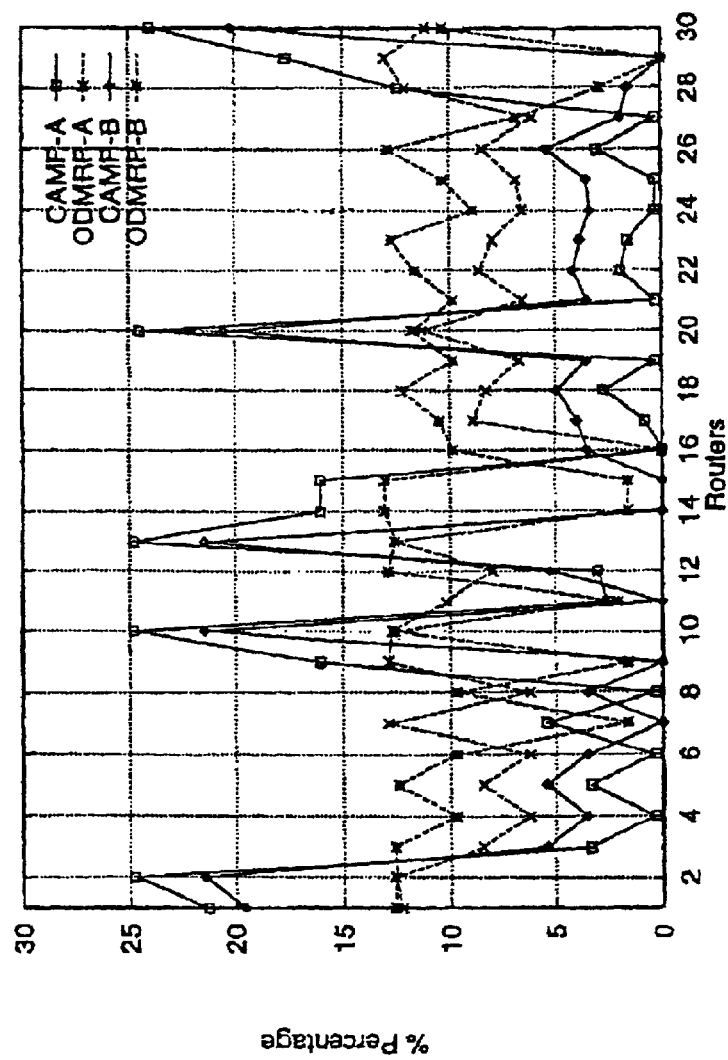
FIG. 21 is a graph of the percentage of data packets missed by each router within FIG. 9 with five nodes mobile and utilizing a source "A" and source "B", showing a comparison between ODMRP and CAMP protocols.
Figure 22:
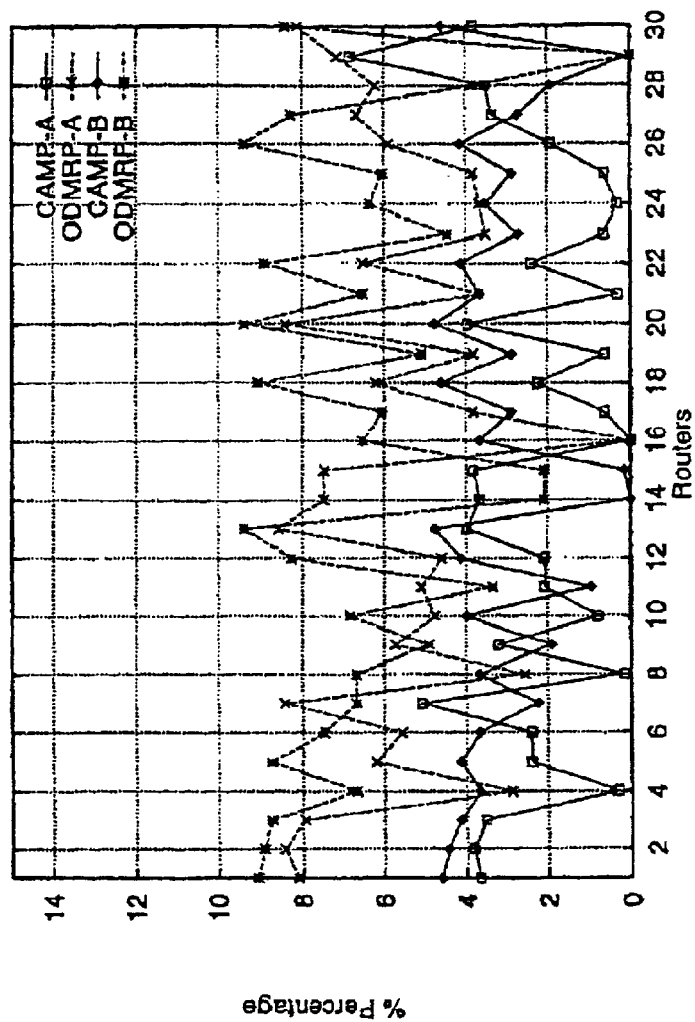
FIG. 22 is a graph of the percentage of data packets missed by each router within FIG. 9 with fifteen nodes mobile and utilizing a source "A" and source "B", showing a comparison between ODMRP and CAMP protocols.

As far as packet losses are concerned, both mesh-based protocols perform similarly when there is a single sender. With the exception of some CAMP routers, as shown in FIG. 21, CAMP routers have been found to consistently exhibit a slightly lower packet loss than their ODMRP counterparts when two senders transmit data packets. As the experiment commences, routers 1, 2, 10, 13, 20, and 30 are all located in the upper left corner of the network, as shown by FIG. 9. Certain CAMP updates were lost and intermediate routers took longer to commence operating as anchors for that portion of the network. Routers 18 and 28 are initially found in the same network area, but are not as negatively impacted because early on during the simulation run they move to other parts of the network.

9. Summary

The present invention of CAMP provides a multicast routing protocol based on a routing structure other than trees that does not require flooding an entire network with control or data packets to setup its routing structure. CAMP comprises the maintenance of multicast meshes and loopless packet forwarding over such meshes. Within the multicast mesh of a group, packets from any source in the group are forwarded along the shortest paths defined within the mesh from the source to the receivers. CAMP is configured to guarantee that within a finite period of time every receiver of a multicast group will provide a reverse shortest path to each source of the multicast group, therein increasing the optimization of the paths traversed within a mesh in relation to the true shortest paths, which may include nodes that are not part of the mesh.

Simulation experiments have affirmed that mesh-based protocols outperform tree-based multicast protocol in dynamic networks. Comparisons with ODMRP indicate that the receiver-initiated approach utilized for mesh joining in CAMP provides enhanced performance and scalability than sender-initiated approaches under the experimental conditions tested. Performance aspects for CAMP within the experiments illustrate that meshes can be used effectively as multicast routing structures without the need for the flooding of control packets.

Accordingly, it will be seen that the core-assisted mesh protocol (CAMP) for multicasting within routing meshes for ad hoc broadcast networks provides advantageous routing of packets for dynamic network. It will be appreciated that various aspects of CAMP has been exemplified by way of example, however, the practice of the invention is not limited to the specific embodiments and functional procedures as outlined within the specification. The functions described for creating and maintaining the multicasting mesh topology according to the present invention may, therefore, be generalized and altered by one of ordinary skill without departing from the teachings of the invention.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of multicast communication within a wireless network, comprising:
   defining a shared multicast mesh of routers for each multicast group wherein multiple paths are established between any two routers; and
   forwarding packets from a source connected within the shared multicast mesh of the multicast group along a reverse shortest path to a receiver;
   wherein the reverse shortest path is a shortest path from the receiver to the source.

2. A method as recited in claim 1, wherein said routers are configured to accept unique packets being received from any neighboring router within the shared multicast mesh.

3. A method as recited in claim 1, wherein said routers maintain the reverse shortest path mapping to the receivers.

4. A method as recited in claim 3, wherein routers maintain the reverse shortest path mapping by sending out a heartbeat message to successors when packets arrive through paths other than their respective reverse shortest path from traffic sources, wherein the heartbeat message as received by the successor triggers a push join operation to force the successor and all routers in the paths to the traffic sources to join the shared multicast mesh.

5. A method as recited in claim 3, wherein routing is established between routers such that network flooding with data or control packets to establish a routing structure is not required.

6. A method as recited in claim 1, wherein routers for sender-only hosts join the multicast mesh in simplex mode.

7. A method as recited in claim 1, wherein routers share group membership reports with neighbors and track relationships between neighbors and groups.

8. A method as recited in claim 7, wherein multicast addresses are mapped to one or more cores as part of a group membership report.

9. A method as recited in claim 1, wherein routers are configured to allow the definition of multiple cores for a group within the shared multicast mesh.

10. A method of allowing a host to join a multicast mesh for multicast communication within a wireless network, comprising:
    determining an address of a first multicast group to which said host desires to join;
    interacting with a first designated router, by said host, requesting that it gain membership in said first multicast group;
    announcing membership in the first multicast group if the first designated router joining has multiple neighboring routers which are duplex members of the first multicast group; and
    sending a join request for membership in the first multicast group to neighboring routers if one or fewer of the neighboring routers are duplex members of the first multicast group.

11. A method as recited in claim 10, wherein the routers are configured to generate an acknowledgement to the join request, such that non-core routers can acknowledge group membership.

12. A method of maintaining shortest path routes within a group's mesh populated with routers, comprising:
    caching packet identifiers of forwarded packets in a cache;
    forwarding a multicast packet from a neighboring router if the packet identifier is not contained within the cache; and
    transmitting heartbeat messages whenever traffic arrives through a path from a source that is not a reverse shortest path, wherein the heartbeat message is configured to trigger a push join to correct routing;
    wherein the reverse shortest path is a shortest path from the receive to the source.

* * * * *